(12) United States Patent
Tanaka et al.

(10) Patent No.: US 11,907,533 B2
(45) Date of Patent: Feb. 20, 2024

(54) COMPUTER SYSTEM AND METHOD FOR RECORDING DATA IN STORAGE DEVICE

(71) Applicant: SONY GROUP CORPORATION, Tokyo (JP)

(72) Inventors: Hisao Tanaka, Tokyo (JP); Tomotaka Kuraoka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 222 days.

(21) Appl. No.: 17/424,587

(22) PCT Filed: Nov. 21, 2019

(86) PCT No.: PCT/JP2019/045698
§ 371 (c)(1),
(2) Date: Jul. 21, 2021

(87) PCT Pub. No.: WO2020/158126
PCT Pub. Date: Aug. 6, 2020

(65) Prior Publication Data
US 2022/0100383 A1 Mar. 31, 2022

(30) Foreign Application Priority Data
Jan. 30, 2019 (JP) ................................ 2019-014789

(51) Int. Cl.
*G06F 3/06* (2006.01)
(52) U.S. Cl.
CPC .......... *G06F 3/0607* (2013.01); *G06F 3/0643* (2013.01); *G06F 3/0683* (2013.01)
(58) Field of Classification Search
CPC .... G06F 3/0607; G06F 3/0643; G06F 3/0683; G06F 3/0686; G06F 12/0223–02348; G11B 20/10; G11B 27/00; G11B 3/06
See application file for complete search history.

(56) References Cited

U.S. PATENT DOCUMENTS

| 2010/0103549 A1* | 4/2010 | Murayama ............ G06F 3/0686 |
| 2010/0125697 A1* | 5/2010 | Lee ........................ G06F 3/0613 711/170 |

(Continued)

FOREIGN PATENT DOCUMENTS

| CA | 2893594 A1 | 6/2014 |
| CN | 104903871 A1 | 9/2015 |

(Continued)

OTHER PUBLICATIONS

International Search Report and Written Opinion of PCT Application No. PCT/JP2019/045698, dated Feb. 15, 2020, 09 pages of ISRWO.

*Primary Examiner* — Khoa D Doan
(74) *Attorney, Agent, or Firm* — CHIP LAW GROUP

(57) ABSTRACT

An archiving apparatus that realizes high-speed seek processes and the like by setting a logical object table for each container file with a predetermined size, and closing the container file under a predetermined condition is provided. A data processing section that executes control of access to a recording medium generates a logical object table for managing a container file including logical objects which are recorded data units, and records the logical object table on a memory. In a case where a prescribed condition is satisfied, for example, the container file size has become equal to or larger than a prescribed end reference value, and so on, while a process on the container file is being executed, the logical object table is read out from the memory, and recorded on the recording medium, and the container file is closed.

16 Claims, 29 Drawing Sheets

(56) References Cited

U.S. PATENT DOCUMENTS

| | | |
|---|---|---|
| 2014/0181395 A1 | 6/2014 | Vincent et al. |
| 2014/0181396 A1 | 6/2014 | Vincent |
| 2014/0189269 A1 | 7/2014 | Hughes et al. |
| 2018/0150258 A1* | 5/2018 | Walsh .................. G06F 3/0644 |

FOREIGN PATENT DOCUMENTS

| | | |
|---|---|---|
| EP | 2936319 A1 | 10/2015 |
| JP | 2009-520279 A | 5/2009 |
| JP | 2016-506575 A | 3/2016 |
| JP | 2016-103304 A | 6/2016 |
| WO | 2014/099682 A1 | 6/2014 |

* cited by examiner

FIG. 6
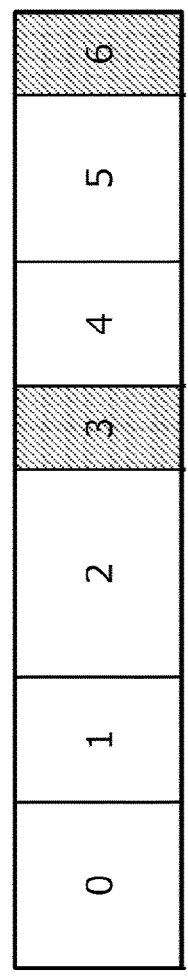
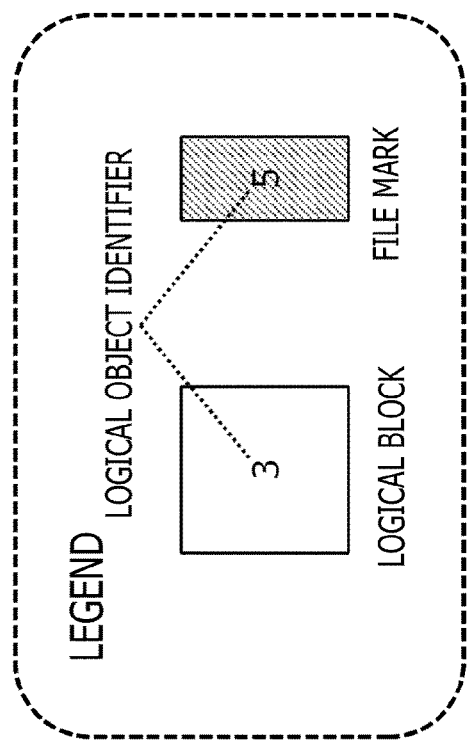

FIG.18
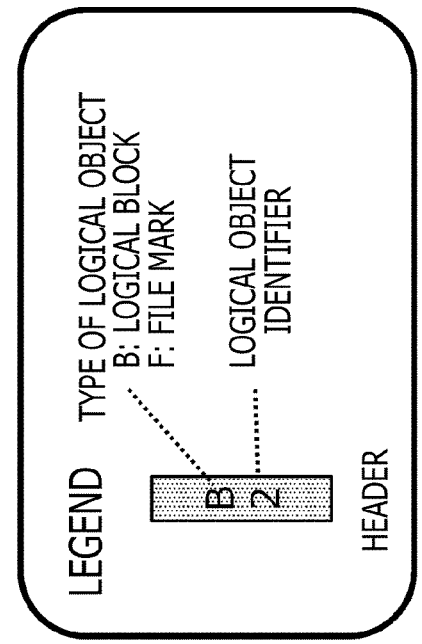
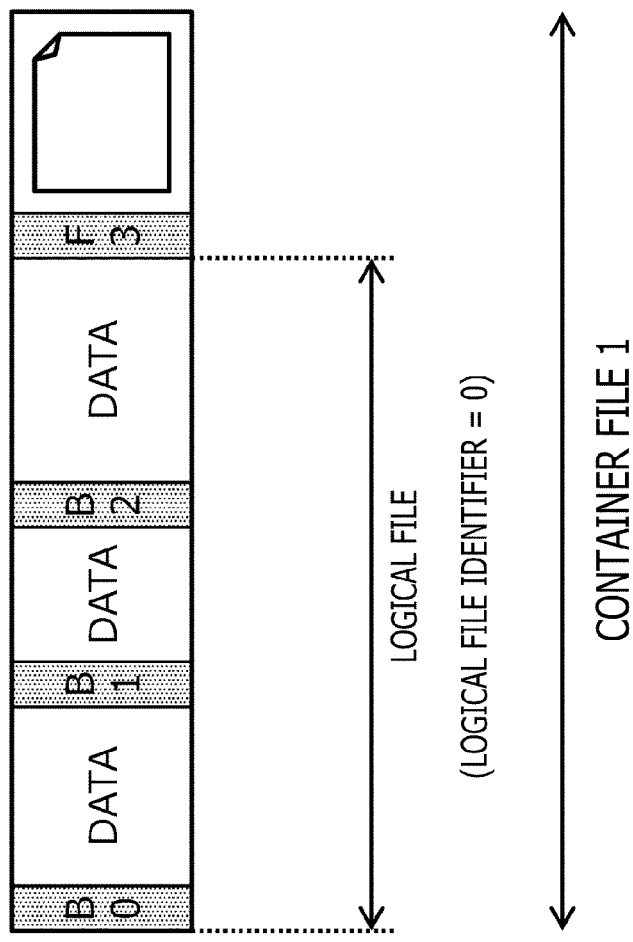

FIG. 20

CONTAINER FILE TABLE
(ON MEMORY)

| FIRST LOGICAL OBJECT ID | FIRST FILE ID | CONTENTS LOGICAL OBJECT COUNT | CONTENTS FILE MARK COUNT |
|---|---|---|---|
| 0 | 0 | 10 | 2 |
| 10 | 2 | 256 | 1 |
| 266 | 3 | 256 | 2 |
| .. | .. | .. | .. |

FIG. 23

| OFFSET POSITION | LOGICAL OBJECT IDENTIFIER | LOGICAL OBJECT TYPE |
|---|---|---|
| 0 | 0 | LOGICAL BLOCK |

LOGICAL OBJECT TABLE (ON MEMORY)

COMPUTER SYSTEM AND METHOD FOR RECORDING DATA IN STORAGE DEVICE

CROSS REFERENCE TO RELATED APPLICATIONS

This application is a U.S. National Phase of International Patent Application No. PCT/JP2019/045698 filed on Nov. 21, 2019, which claims priority benefit of Japanese Patent Application No. JP 2019-014789 filed in the Japan Patent Office on Jan. 30, 2019. Each of the above-referenced applications is hereby incorporated herein by reference in its entirety.

TECHNICAL FIELD

The present disclosure relates to an information processing apparatus, an information processing method, and a program. Specifically, the present disclosure relates to an information processing apparatus and an information processing method, and a program for executing data recording and readout by using an archiving apparatus having a data recording/storage functionality.

BACKGROUND ART

There are known archiving apparatuses as data recording apparatuses that enable long-term storage of data. For example, archiving apparatuses are used in a case where various types of data used by a computer are backed up as a preparation for the time of occurrence of faults, or stored for a long term into the future.

As conventional technologies that disclose archiving apparatuses, there are PTL 1 (Japanese Patent Laid-open No. 2016-103304), PTL 2 (National Publication of International Patent Application No. 2009-520279), and the like, for example.

Many conventional archiving apparatuses have used magnetic tapes as recording media.

A tape apparatus is used for reading data from, and writing data on magnetic tapes, and in most cases, command sets (SSC command sets) called SSC (SCSI Stream Commands) specified in the SCSI (Small Computer System Interface) standard are used in communication between the tape apparatus and a host PC at that time.

However, there is a problem that magnetic tapes are inferior in terms of random access performance, and archiving apparatuses that use disk-type recording media that realize a high random access performance, for example, magnetic disks and optical disks, are increasingly used.

However, command sets called SBC (SCSI Block Commands) and MMC (Multi-Media Commands) specified in the SCSI standard are used for magnetic disk apparatuses and optical disk apparatuses, respectively, and these are incompatible with SSC command sets used for tape apparatuses.

Many of conventional application programs for backup or archiving perform control by using SSC command sets supporting magnetic tapes, and there is a problem that it is not possible to simply replace tape apparatuses with disk apparatuses in a case where such applications are used.

CITATION LIST

Patent Literature

[PTL 1]
Japanese Patent Laid-open No. 2016-103304

[PTL 2]
National Publication of International Patent Application No. 2009-520279

SUMMARY

Technical Problem

The present disclosure has been made in view of the problems described above, for example, and an object thereof is to provide an information processing apparatus and an information processing method, and a program for realizing access to archiving apparatuses having disk-type recording media such as magnetic disks or optical disks by using conventional SSC command sets supporting magnetic tapes.

Solution to Problem

A first aspect of the present disclosure resides in an information processing apparatus including a data processing section that executes control of access to a recording medium, in which the data processing section generates a logical object table that is a management table for each container file including a logical object that is a unit of data recorded on the recording medium, and records the logical object table on a memory, and during execution of a process on a container file to be recorded on the recording medium, decides whether or not a container file size has become equal to or larger than a prescribed reference value, and in a case where it is decided that the container file size has become equal to or larger than the reference value, reads out the logical object table from the memory, records the logical object table on the recording medium, and closes the container file.

Furthermore, a second aspect of the present disclosure resides in an information processing method executed in an archiving apparatus, in which the archiving apparatus includes a data processing section that executes control of access to a recording medium, and the data processing section generates a logical object table that is a management table for each container file including a logical object that is a unit of data recorded on the recording medium, and records the logical object table on a memory, and during execution of a process on a container file to be recorded on the recording medium, decides whether or not a container file size has become equal to or larger than a prescribed reference value, and in a case where it is decided that the container file size has become equal to or larger than the reference value, reads out the logical object table from the memory, records the logical object table on the recording medium, and closes the container file.

Furthermore, a third aspect of the present disclosure resides in a program for causing an archiving apparatus to execute information processing, in which the archiving apparatus includes a data processing section that executes control of access to a recording medium, and the program causes the data processing section to generate a logical object table that is a management table for each container file including a logical object that is a unit of data recorded on the recording medium, and record the logical object table on a memory, and during execution of a process on a container file to be recorded on the recording medium, decide whether or not a container file size has become equal to or larger than a prescribed reference value, and in a case where it is decided that the container file size has become equal to or larger than the reference value, read out the logical object table from the memory, record the logical object table on the recording medium, and execute a process of closing the container file.

Note that, for example, the program of the present disclosure is a program that can be provided in a storage medium or a communication medium that provides, in a computer-readable format, various program codes to an information processing apparatus, an image processing apparatus or a computer system that can execute those various program codes. By providing such a program in the computer-readable format, processes according to the program are realized on the information processing apparatus or the computer system.

Still other objects, features, and merits of the present disclosure will become apparent from more detailed explanations based on embodiments, and attached figures of the present invention mentioned below. Note that, in the specification, systems are a logical set configuration of a plurality of apparatuses but are not limited to ones having apparatuses of individual configurations that are located in a single housing.

Advantage Effects of the Invention

According to the configuration of one embodiment of the present disclosure, an archiving apparatus that realizes high-speed seek processes and the like by setting a logical object table for each container file with a predetermined size, and closing the container file under a predetermined condition is realized.

Specifically, for example, a data processing section that executes control of access to a recording medium generates a logical object table for managing a container file including logical objects which are recorded data units, and records the logical object table on a memory. In a case where a prescribed condition is satisfied, for example, the container file size has become equal to or larger than a prescribed end reference value, and so on, while a process on the container file is being executed, the logical object table is read out from the memory, and recorded on the recording medium, and the container file is closed.

According to this configuration, an archiving apparatus that realizes high-speed seek processes and the like by setting a logical object table for each container file with a predetermined size, and closing the container file under a predetermined condition is realized.

Note that the advantage effects described in the specification are presented merely for illustration but not for limitation, and there may be additional advantage effects.

BRIEF DESCRIPTION OF DRAWINGS

FIG. 6 is a figure for explaining a configuration in which a container file is treated as a tape, and logical blocks, and file marks are recorded sequentially on the container file.

FIG. 18 is a figure for explaining one example of a container file.

FIG. 20 is a figure for explaining a container file table.

FIG. 23 is a figure for explaining a data example of a logical object table on a memory.

DESCRIPTION OF EMBODIMENTS

Hereinafter, details of an information processing apparatus, an information processing method, and a program of the present disclosure are explained with reference to the figures. Note that explanations are given according to the following items.

1. About Overview of Archiving Apparatus that Uses Magnetic Tapes, and Processes that are Necessary in Case where Disks have Replaced Magnetic Tapes as Recording Media
2. About Configuration and Processes of Archiving Apparatus of Present Disclosure
  2-1. About Configuration Example of Information Processing System of Present Disclosure
  2 2. About Details of Process of Recording Logical Object Table on Medium Executed by Archiving Apparatus of Present Disclosure
    2-2-1. Format of Container File
    2-2-2. Division of Container File
    2-2-3. Name of Container File
    2-2-4. Container File Table
    2-2-5. Advantage effects of Configuration of Present Disclosure
3. About Sequences of Processes Executed by Archiving Apparatus of Present Disclosure
  3-1. (Process 1) Unused Recording Medium Mounting Process
  3-2. (Process 2) Logical Block Appending Process
  3-3. (Process 3) File Mark Appending Process
  3-4. (Process 4) Process to be Performed in Case where Size of Container File has Reached End Reference Value
  3-5. (Process 5) Process to be Performed in Case where Logical Object Count of Container File has Reached Upper Limit
  3-6. (Process 6) Process to be Performed in Case where Free Space of Disk on which Recording is being Performed has Fallen below Reference Value
  3-7. (Process 7) Process to be Performed at the Time of Unmounting
  3-8. (Process 8) Recorded Medium Mounting Process
  3-9. (Process 9) Process to be Performed at the Time of Seeking
4. About Hardware Configuration Examples of Archiving Apparatus and Host PC
5. Summary of Configuration of Present Disclosure

[1. About Overview of Archiving Apparatus that Uses Magnetic Tapes, and Processes that are Necessary in Case where Disks have Replaced Magnetic Tapes as Recording Media]

Before an explanation of processes of the present disclosure, first, the overview of an archiving apparatus that uses magnetic tapes, and processes that are necessary in a case where disks have replaced the magnetic tapes as recording media are explained.

As mentioned before, many conventional archiving apparatuses use magnetic tapes as recording media.

Figure 1:
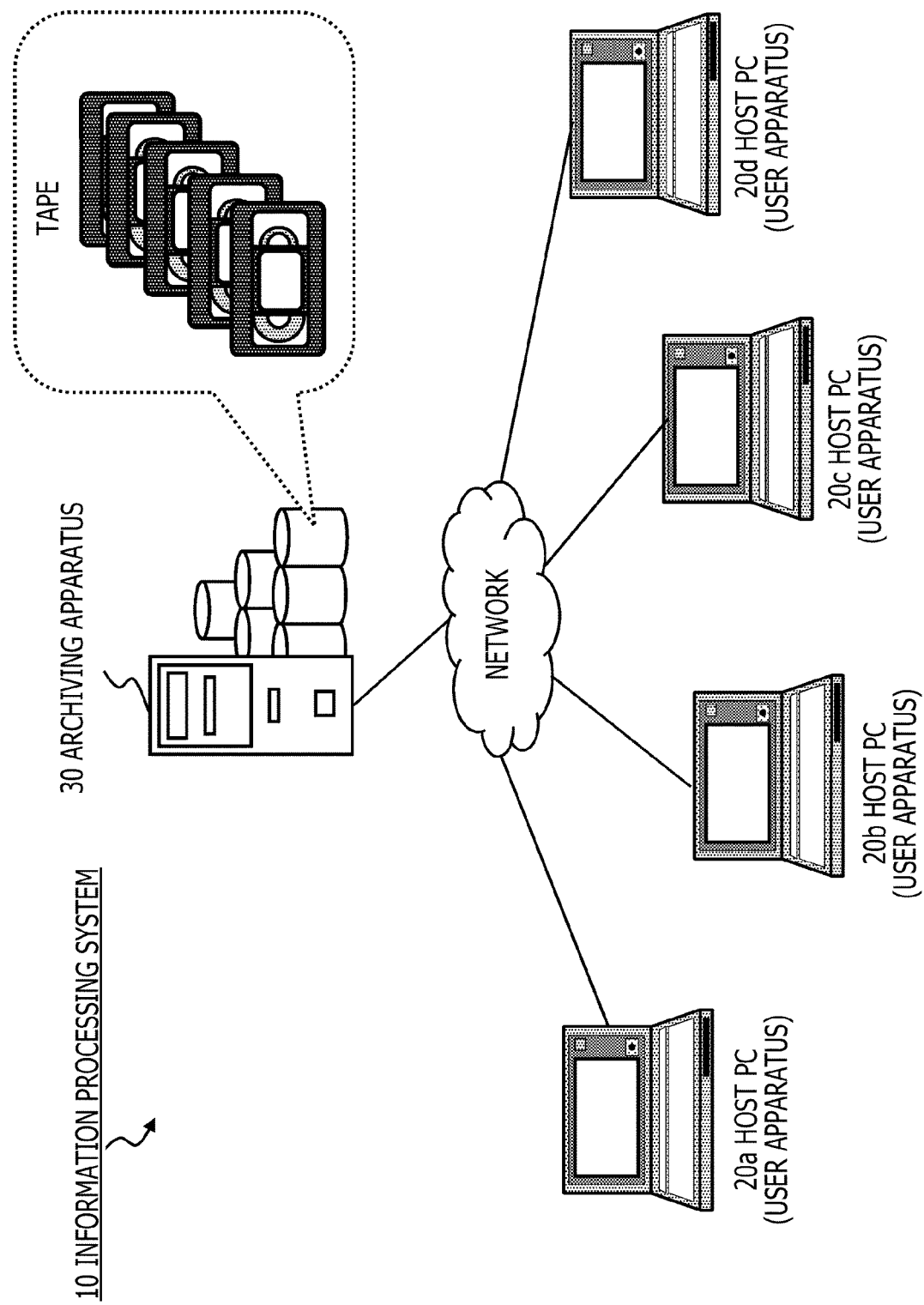
FIG. 1 is a figure for explaining a configuration example of an information processing system that uses an archiving apparatus that uses magnetic tapes as recording media.

FIG. 1 depicts a configuration example of an information processing system 10 that uses an archiving apparatus that uses magnetic tapes as recording media.

The information processing system 10 has an archiving apparatus 30 that executes data recording and readout on and from tapes which are recording media, and host PCs (user apparatuses) 20a to 20d network-connected with the archiving apparatus 30.

The host PCs (user apparatuses) 20a to 20d request the archiving apparatus 30 to record data on tapes and read out data from tapes via the network.

In communication between the archiving apparatus 30 and the network-connected host PCs (user apparatuses) 20a to 20d, a command set (SSC command set) called SSC (SCSI Stream Commands) specified in the SCSI (Small Computer System Interface) standard is used in most cases.

(1a, About SSC)

SSC (SCSI Stream Commands) used as commands for accessing magnetic tapes are explained.

In an SSC command set, a recording apparatus including magnetic tapes, and a tape apparatus is abstracted and defined in a model called a sequential access device model.

This model is explained with reference to FIG. 2. In this model, a section that is provided on a tape, and is for recording is called a partition, as depicted in FIG. 2.

Figure 2:
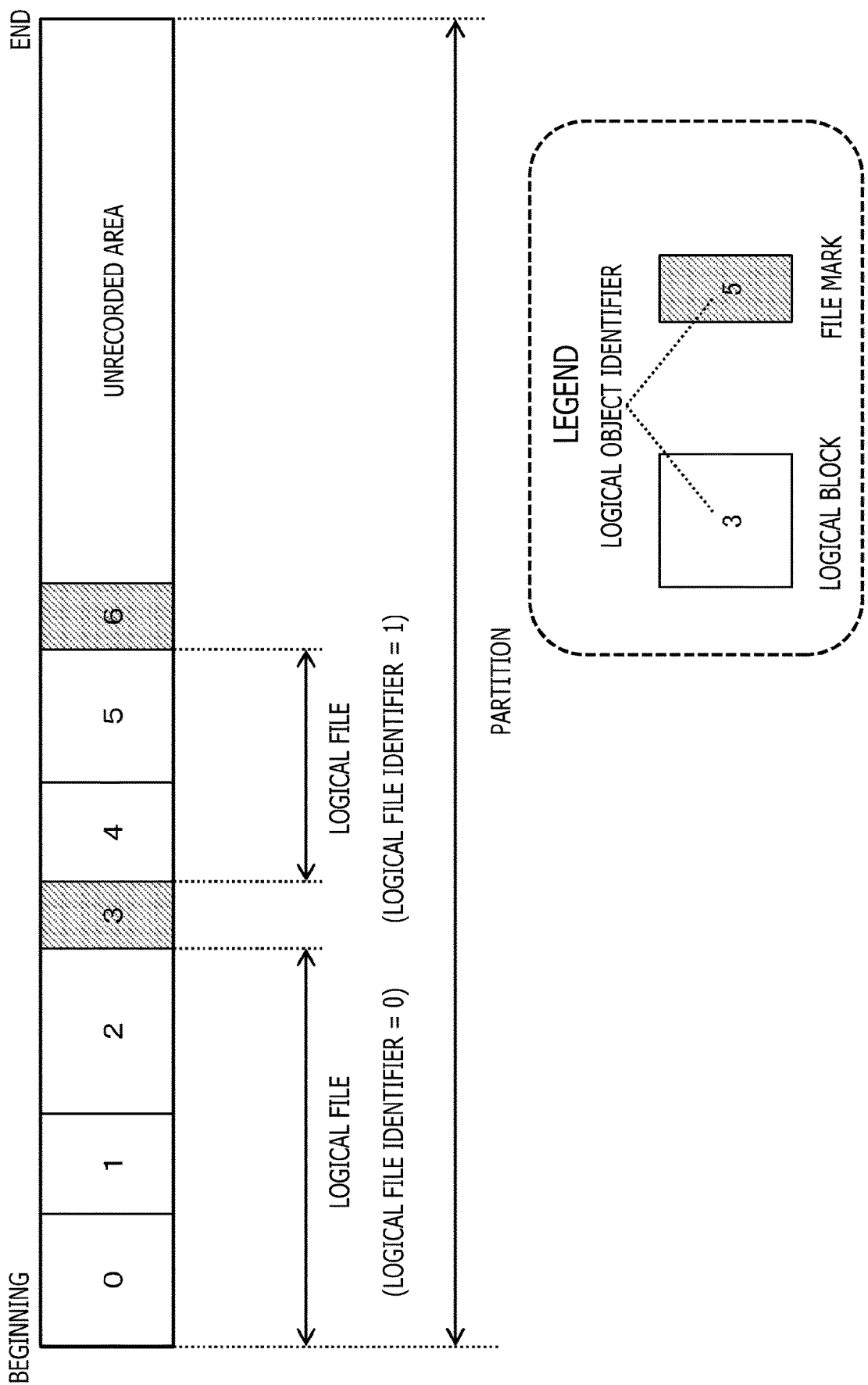
FIG. 2 is a figure for explaining a sequential access device model including a magnetic tape and a tape apparatus.

As depicted in FIG. 2, logical blocks and file marks are recorded in the partition continuously.

Here, logical blocks are blocks of data sent from host PCs which are user apparatuses that access an archiving apparatus.

The size of each logical block is variable and can be decided by applications on the host PCs.

The maximum length defined in the SSC standard is 224-1 bytes, and typically is several dozen kilobytes to several hundred kilobytes in many cases.

In addition, file marks are positioning marks representing positions where applications on the host PCs can write in data at a certain time point.

In the SSC standard, logical blocks and file marks are collectively called logical objects.

In order to identify logical objects, each logical object is allocated a logical object identifier.

The logical object identifier of a logical object recorded at the beginning of a volume is set to 0, and thereafter serial numbers are allocated in ascending order.

In addition, consecutive logical blocks between which there are no file marks are called a logical file.

Logical files are divided by file marks. In order to identify logical files, each logical file is allocated a logical file identifier.

The logical file identifier of a logical file recorded at the beginning is set to 0, and thereafter serial numbers are allocated in ascending order.

In the SSC standard, commands such as WRITE, WRITE FILEMARK, READ, SPACE, LOCATE, or LOAD UNLOAD are defined as commands for transmission and reception between host PCs, and an archiving apparatus having tapes as recording media.

WRITE is a command for writing logical block data sent from the host PC 20 to the archiving apparatus 30 at the current position on a tape.

WRITE FILEMARK is a command for writing a file mark at the current position on a tape.

READ is a command for reading out a logical block from the current position on a tape, and sending the logical block from the archiving apparatus 30 to the host PC 20.

SPACE is a command for shifting the current position on a tape by a specified number of logical objects, or by a specified number of file marks.

LOCATE is a command for shifting the current position on a tape to a logical object position specified by using a logical object identifier.

LOAD UNLOAD is a command for mounting or unmounting a tape on or from the archiving apparatus 30.

(1b. About System Configuration Example)

Figure 3:
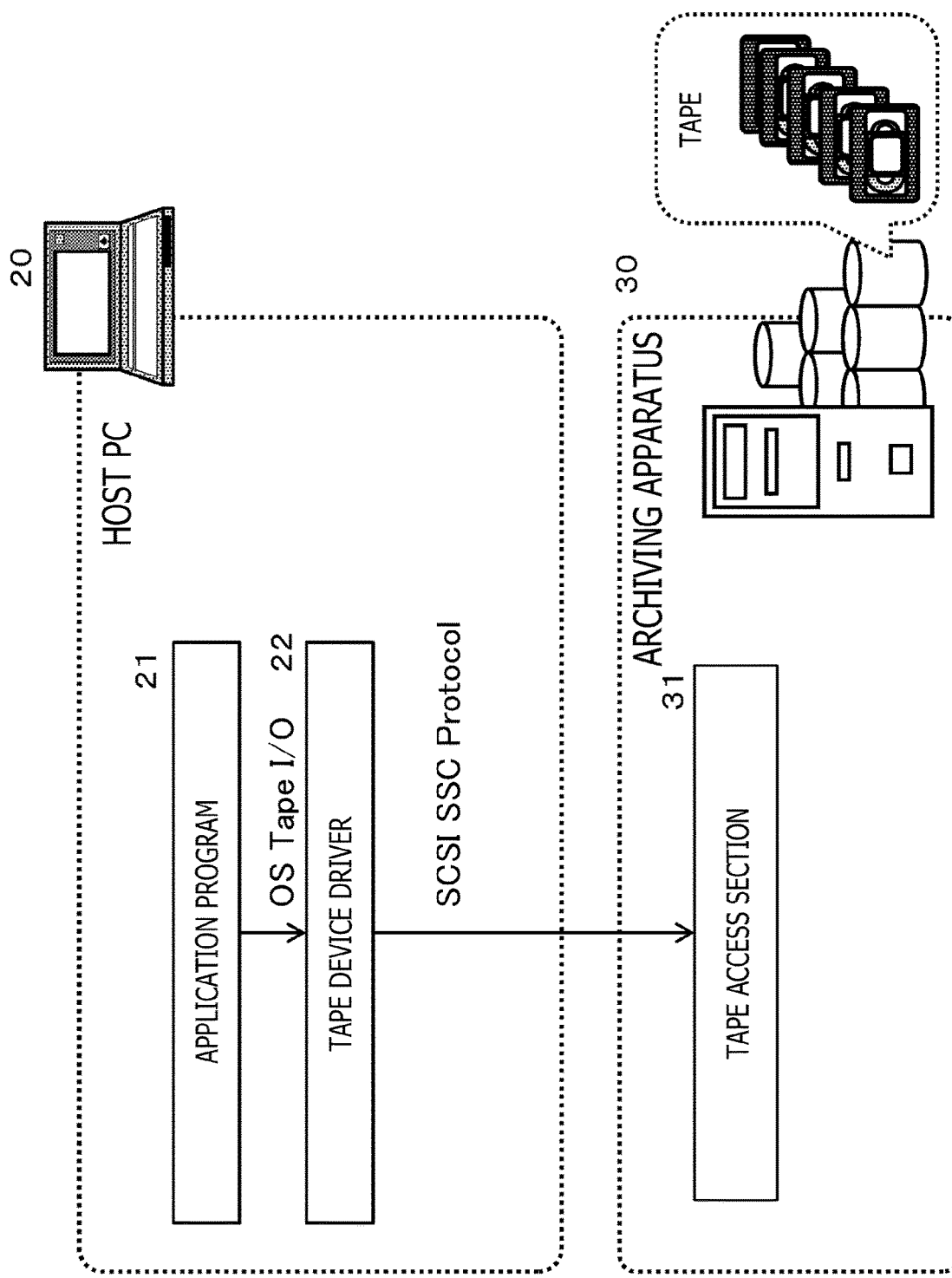
FIG. 3 is a figure for explaining a configuration and processes of each of the archiving apparatus that uses tapes as recording media, and a host PC.

Next, with reference to FIG. 3 and subsequent figures, a configuration and processes of each of the archiving apparatus 30 that uses tapes as recording media, and the host PC 20 are explained.

FIG. 3 depicts a configuration example in which the host PC 20 is directly connected to the archiving apparatus 30 without using a network.

The host PC 20 has an application program 21 and a tape device driver 22.

The application program 21 accesses the archiving apparatus 30 through the tape device driver 22 in most cases. The tape device driver 22 outputs an SSC command according to the SCSI-SSC protocol to the archiving apparatus 30.

A tape access section 31 of the archiving apparatus 30 uses the SSC command input from the host PC 20 to access a tape which is a recording medium, and executes data recording and readout.

In this manner, the tape device driver 22 of the host PC 20 accesses the archiving apparatus 30 in accordance with the SSC standard.

There can be an application program 21 that accesses the archiving apparatus 30 directly, and in that case the application program 21 performs the access in accordance with the SSC standard.

Figure 4:
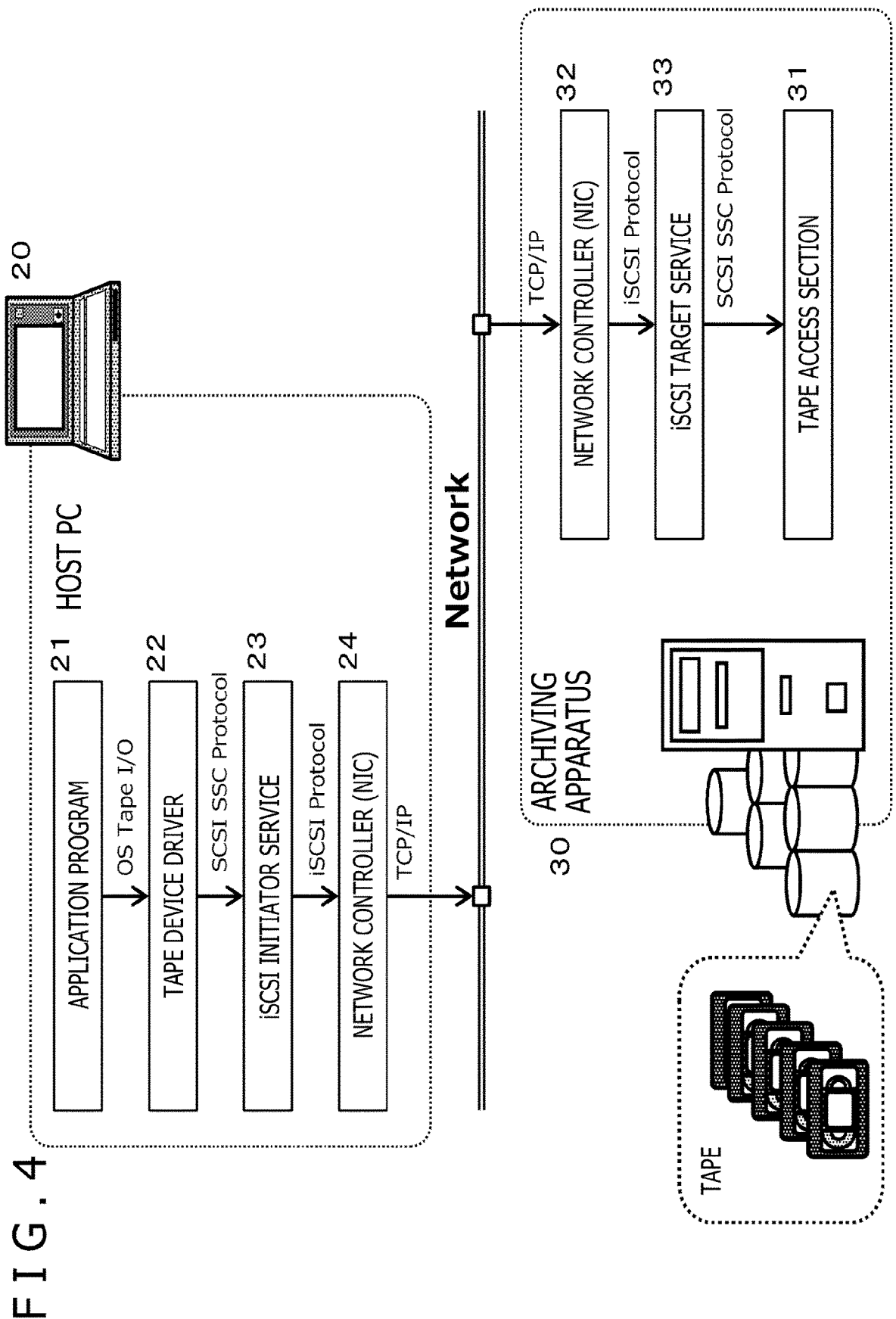
FIG. 4 is a figure for explaining a configuration and processes of each of the archiving apparatus that uses tapes as recording media, and the host PC.

FIG. 4 depicts a configuration example in which the host PC 20 and the archiving apparatus 30 are connected by a network. This is equivalent to the system configuration explained with reference to FIG. 1 earlier. This is a system configuration example in which an iSCSI interface is used.

In addition to the application program 21, and the tape device driver 22, the host PC 20 has an iSCSI initiator service 23, and a network controller (NIC) 24.

On the other hand, the archiving apparatus 30 also has a network controller (NIC) 32, and an iSCSI target service 33, in addition to the tape access section 31.

The iSCSI initiator service 23, and the network controller (NIC) 24 of the host PC 20, and the network controller (NIC) 32, and the iSCSI target service 33 of the archiving apparatus 30 execute processes that are necessary for processes of transmitting and receiving SSC commands via the network.

In the configuration depicted in FIG. 4, SSC commands are transmitted and received through the iSCSI initiator service 23, and the iSCSI target service 33, but for the application program 21 of the host PC 20, this configuration is equivalent to the configuration depicted in FIG. 3 mentioned earlier, and processes to be executed by the application are the same.

(1c. About Problems that Occur in Case where Disks Replaced Tapes as Recording Media)

The per-byte unit price of magnetic tapes is low, and the magnetic tapes have high capacity. However, on the other hand, magnetic tapes have a drawback that they are inferior in terms of random access performance in principle.

In order to attain random access performance, and other functionality and performance that magnetic tapes lack, it is effective to use magnetic disks or optical disks instead of magnetic tapes.

However, as mentioned before, command sets called SBC (SCSI Block Commands) and MMC (Multi-Media Commands) specified in the SCSI standard are used for magnetic disk apparatuses and optical disk apparatuses, respectively, and these are incompatible with SSC command sets used for tape apparatuses.

Many of conventional application programs for backup or archiving perform control by using SSC command sets but it is not possible to simply replace tape apparatuses with disk apparatuses for such applications.

In order to solve the problem, a system called a virtual tape library (VTL: Virtual Tape Library) is devised, and put in practical use.

Figure 5:
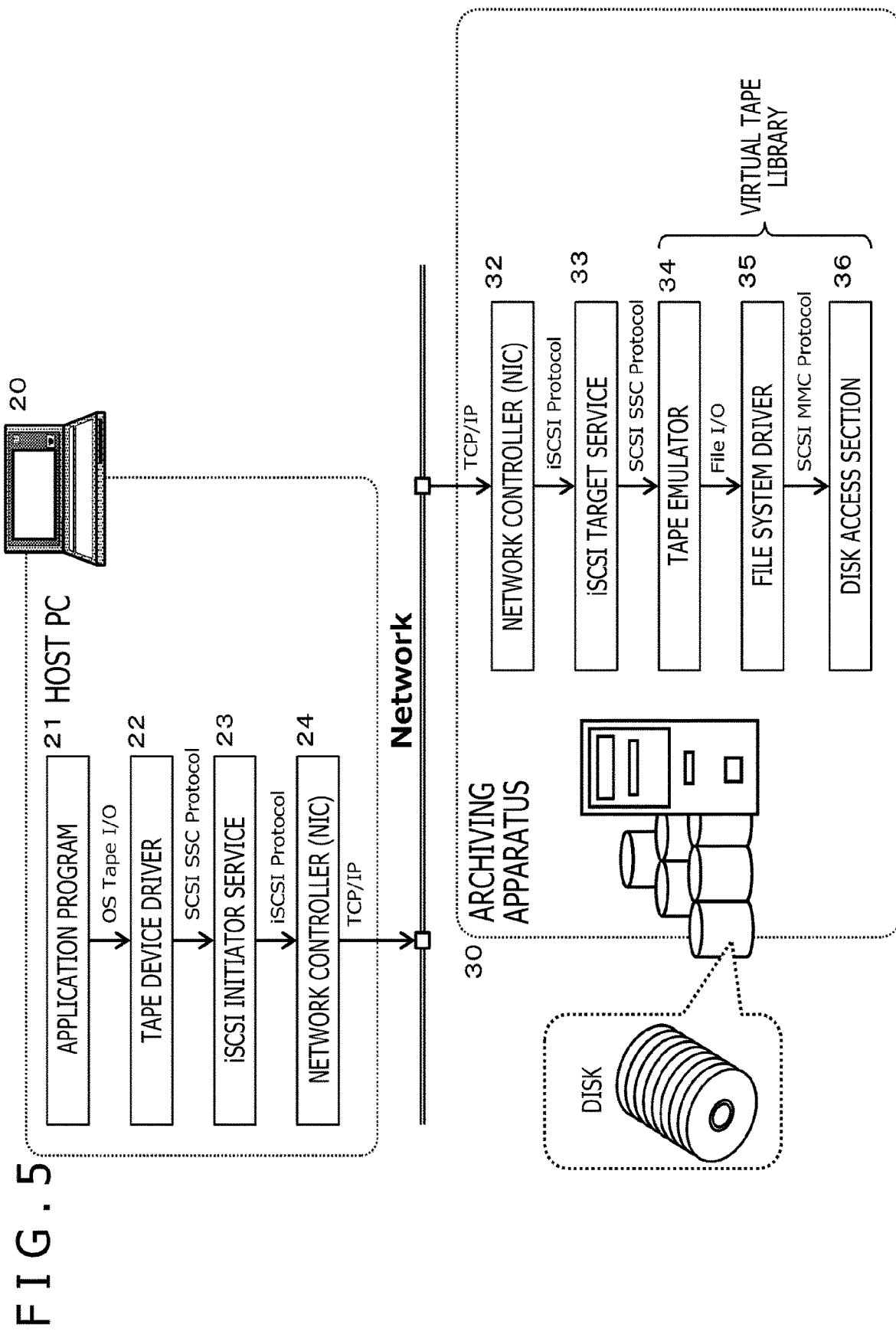
FIG. 5 is a figure for explaining configurations and processes of the network-connected host PC, and archiving apparatus having disks as recording media.

With reference to FIG. 5, configurations and processes of the network-connected host PC 20, and archiving apparatus 30 having disks as recording media are explained.

The host PC 20 has a configuration completely similar to the configuration explained with reference to FIG. 4 earlier and executes processes that are completely the same as processes to be performed in a case where recording media of the archiving apparatus 30 are tapes.

On the other hand, instead of the tape access section 31 depicted in FIG. 5, the archiving apparatus 30 has a tape emulator 34, a file system driver 35, and a disk access section 36.

The configuration including the tape emulator 34, the file system driver 35, and the disk access section 36 is equivalent to a virtual tape library (VTL: Virtual Tape Library).

The file system driver 35 is a driver that enables use of a disk-accessing file system that uses SBC or MMC command sets which are disk-accessing commands. The tape emulator 34 that is on the upstream side of the file system driver 35 is emulation software that interprets tape-accessing commands generated by the host PC 20, and converts the tape-accessing commands into disk-accessible commands.

This emulation software has a functionality of interpreting SSC command sets received from the host PC 20, and recording, as a file, data that should originally be recorded on a tape.

According to this configuration, it becomes possible to apply application program resources that have conventionally been developed for tapes to a disk apparatus, without modifying the application program resources.

In the archiving apparatus 30 in FIG. 4 explained earlier, the iSCSI target service 32 directly controls the tape access section 31 by using tape-accessing SSC commands. In contrast to this, in the archiving apparatus 30 depicted in FIG. 5, the disk access section 36 is controlled by converting SSC commands into SBC or MMC commands which are disk-accessing commands through the tape emulator 34 and the file system driver 35. Thereby, the host PC 20 can perform disk access by processes similar to those for tape media.

(1d. Specific Example of Process Using Virtual Tape Library)

Next, a specific example of a process using a virtual tape library is explained.

Note that in the present disclosure, a file which is the destination of recording of data received by the archiving apparatus 30 having the virtual tape library from the host PC 20 is called a container file.

In one possible method of realizing the virtual tape library, as depicted in FIG. 6, a container file is treated as a tape, and logical blocks and file marks are recorded sequentially on the container file.

However, without modifications, it is not possible to make distinctions between the logical blocks and the file marks, and also it is not possible to decide the boundaries between logical blocks.

(1d-1. Header Method)

Figure 7:
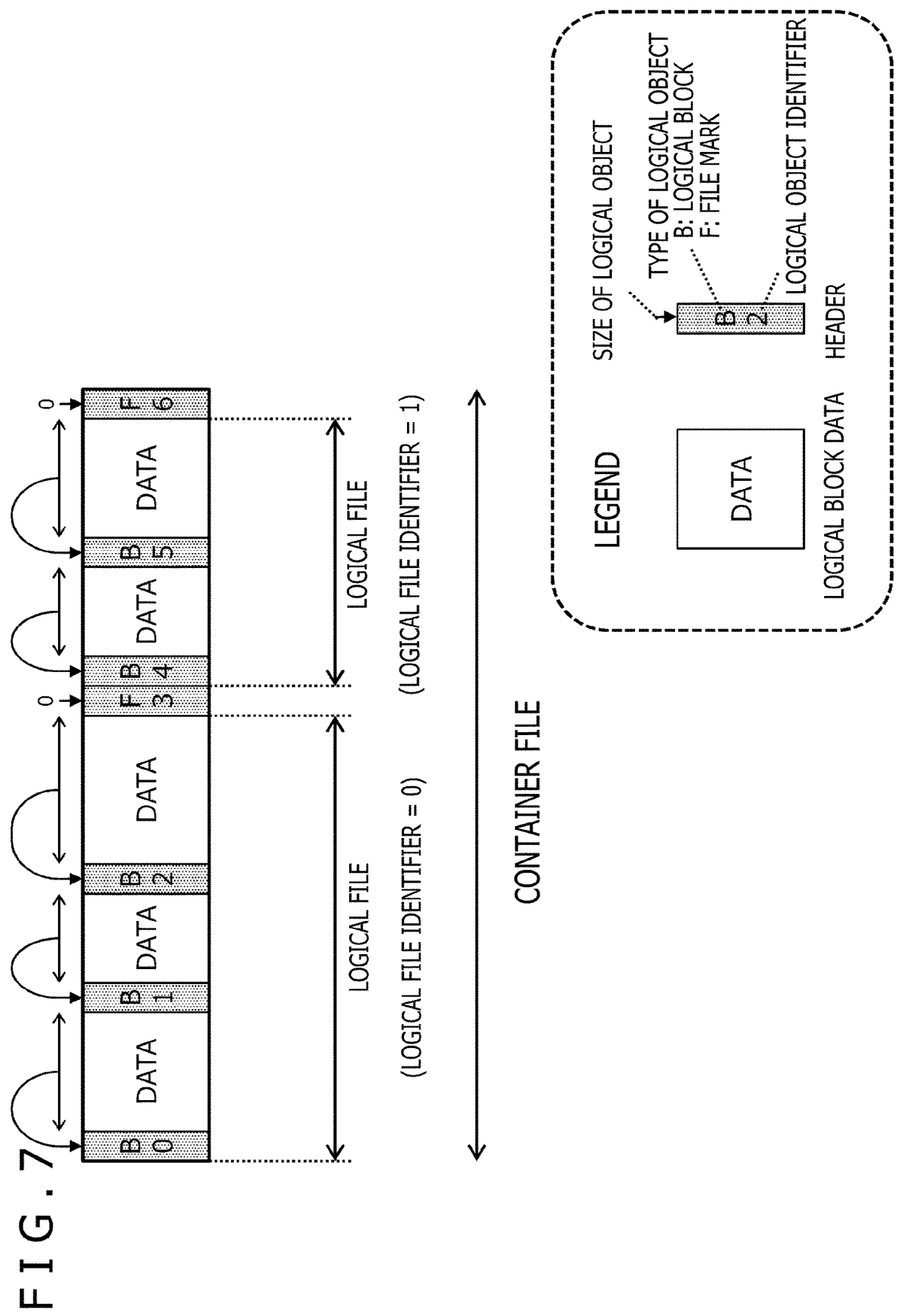
FIG. 7 is a figure for explaining a configuration in which a header with a fixed length is provided before each logical object.

In view of this, in one possible method, headers with a fixed length are provided before logical objects as depicted in FIG. 7.

Type information representing whether a logical object is a logical block or a file mark, and the size and logical object identifier of the logical object are recorded in a header, for example.

In a case where the type is a logical block, data of the logical block with a length represented by the size is recorded immediately after the header.

In addition, in a case where the type is a file mark, the size of the logical object is 0, and nothing is recorded immediately after the header, or the header of the next logical object is recorded.

That is, the header start position of a logical object in a container file is a position which is the size of the header of the preceding logical object plus the logical object size recorded in the header after the start position of the header of the preceding logical object.

By adding headers in this manner, it is possible to decide types and boundaries of logical objects in a container file.

The virtual tape library in the archiving apparatus 30 can seek a certain position by referring to headers sequentially, but this does not provide a good random access performance because readout operation and seek operation are repeated every time a header is referred to.

(1d-2. Table Method)

Figure 8:
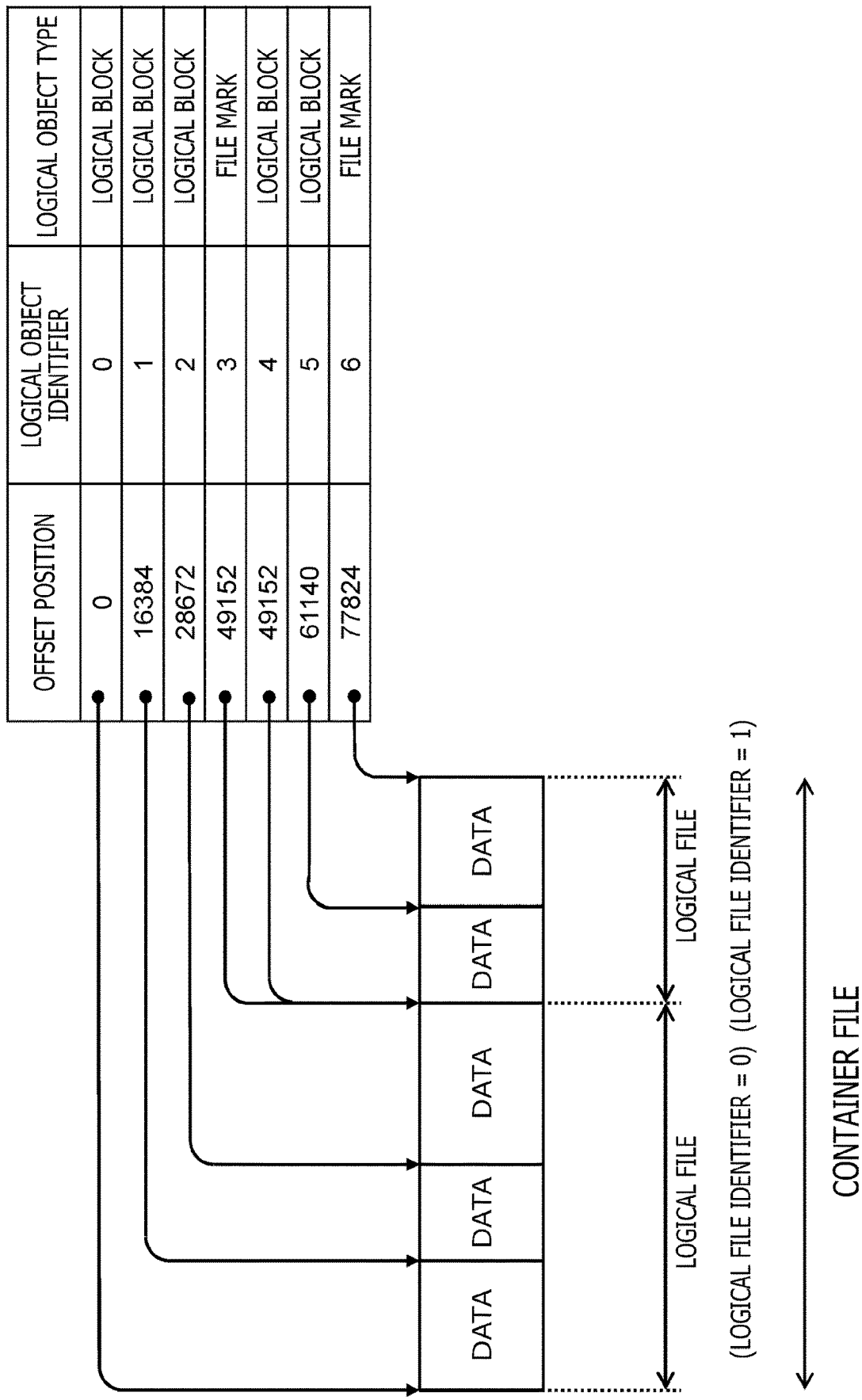
FIG. 8 is a figure for explaining a configuration in which information equivalent to headers is not dispersed but gathered in a table.

In contrast to the header method mentioned above, there is another possible method in which information equivalent to headers is not dispersed but gathered in a table as depicted in FIG. 8.

Each entry of a logical object table depicted in FIG. 8 corresponds to one logical object recorded on a recording medium, and the type and logical object identifier of the logical object, and the offset position from the beginning of the container file to which the logical object belongs are described therein.

When the archiving apparatus 30 that has a virtual tape library using the table method performs seek operation, it is sufficient for the archiving apparatus 30 to search the logical object table for an entry having a sought logical object identifier, and seek an offset position described therein.

That is, seek operation needs to be performed only once, and so this provides a good random access performance.

On the other hand, the table method gives rise to a problem as to where the logical object table should be kept.

In terms of search speed, the logical object table is preferably recorded on a memory in the archiving apparatus 30.

However, in a case where a removable recording medium such as an optical disk is used as a recording medium, the logical object table is desirably recorded on the removable recording medium such as the optical disk when the medium is removed from a recording apparatus.

Figure 9:
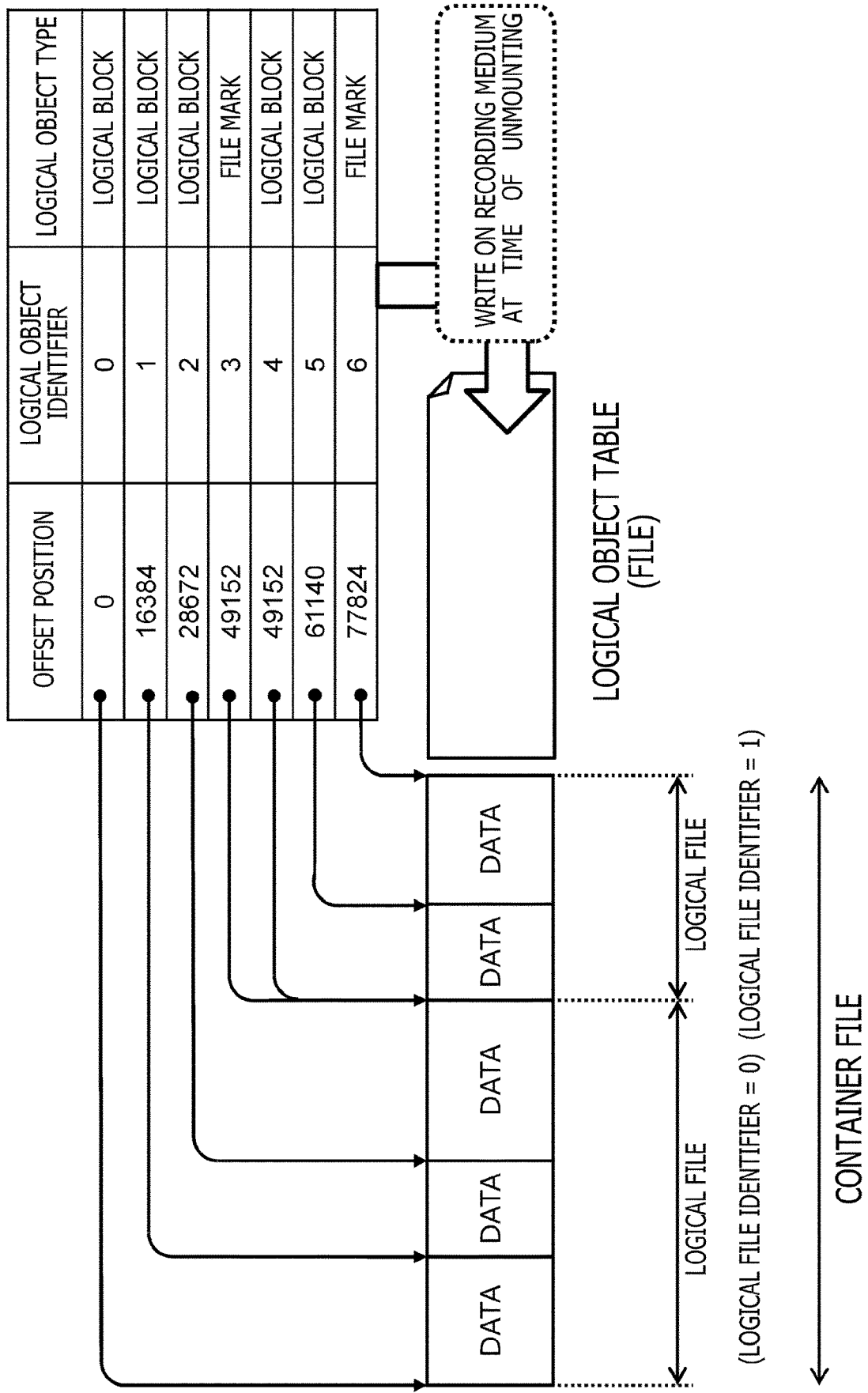
FIG. 9 is a figure for explaining a configuration in which a logical object table is placed on a memory while a disk is left mounted, and the table is written back to the disk immediately before the disk is unmounted.

In one possible method for meeting both demands, as depicted in FIG. 9, in a state that the removable recording medium such as the optical disk is attached to the apparatus, that is, while the disk is left mounted, the logical object table is placed on the memory, and immediately before the disk is removed, that is, immediately before the disk is unmounted, the table is written back to the disk.

In one possible format, the logical object table may be recorded as an independent file of a container file, or in another possible format, the logical object table may be added to the end of the container file.

However, it should be noted that in this method, in a case where an abnormality such as power interruption occurs while the recording medium is left mounted, even if logical block data is recorded on the recording medium, the logical object table for referring to it is lost inevitably, and so it becomes impossible to correctly access logical objects.

That is, it can be said that this method is inferior in terms of fault recovery performance.

(1d-3. Header/Table-Combined Method)

Figure 10:
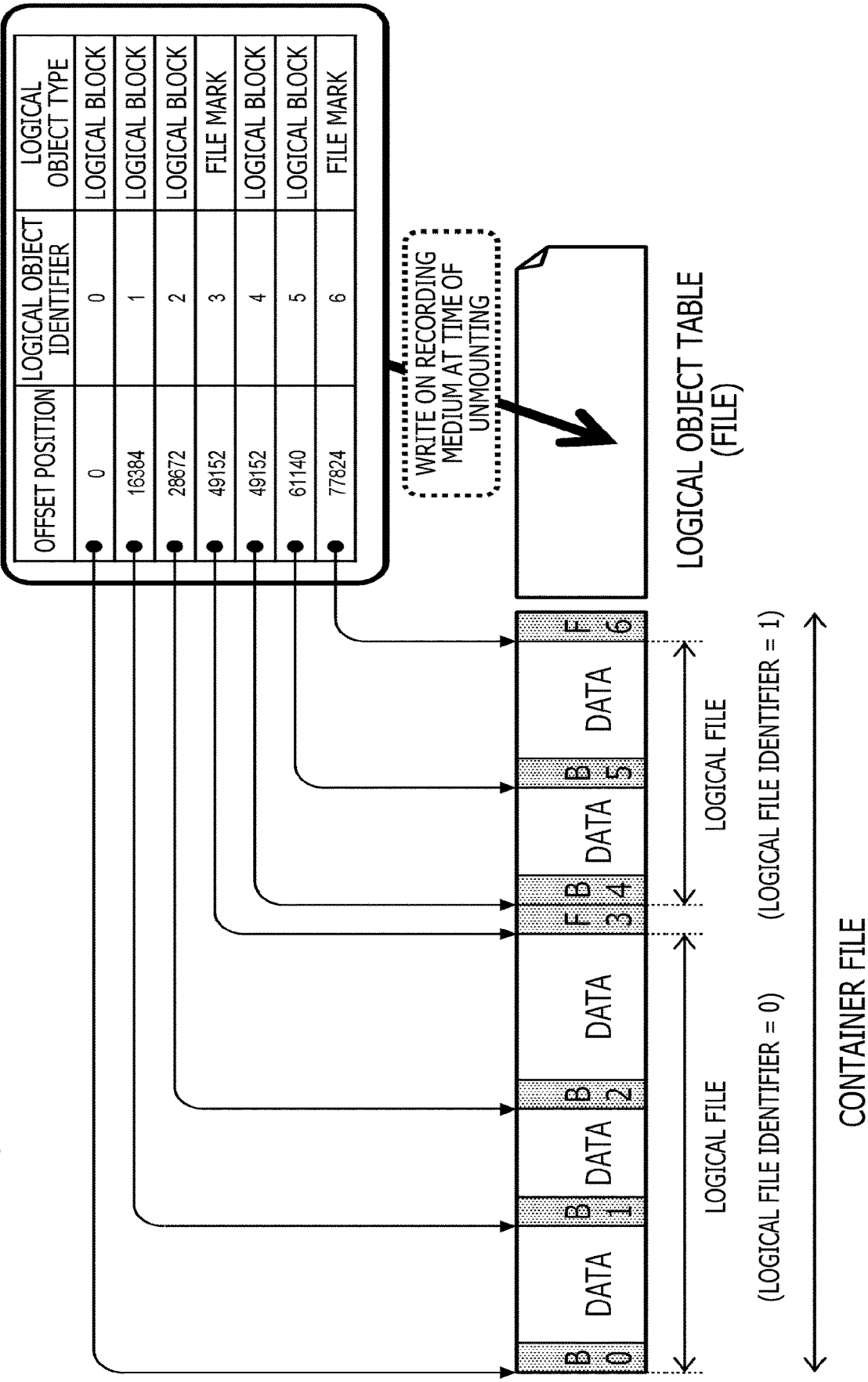
FIG. 10 is a figure for explaining a combined method of a header method and a table method.

In view of this, in one possible method, the method mentioned before in which headers are used, and the method mentioned before in which a table is used may be used in combination as depicted in FIG. 10.

In this header/table-combined method, header recording processes and table referring processes are used in combination. At the time of data recording, a header with a fixed length is additionally recorded before each logical object every time a logical object recording process is performed. Furthermore, immediately before a removable recording medium such as an optical disk is removed, that is, immediately before the disk is unmounted, a logical object table is recorded on the disk. In one possible format, the table may be recorded as an independent file of a container file, or in another possible format, the table may be added to the end of the container file.

By using headers and a table in combination in this manner, it becomes possible to realize fast random access by using a logical object table on a memory at the time of a seek process. In addition, in a case where power interruption occurs while the recording medium is left mounted, the logical object table can be reconstructed by reading out header information recorded in a container file on the recording medium.

(1e. About Cautionary Points and Problems in Case where Virtual Tape Library is Used)

Next, cautionary points and problems in a case where the virtual tape library mentioned above is used are explained.

(1e-1. About Container File Format)

Typically, in a case where a fixed recording apparatus such as a hard disk is used, a system constructed with a host PC and the recording apparatus, and software is used as integrally in many cases.

In such a case, even if a container file recorded on the hard disk is created in a unique format, the software used integrally with the container file can be used without any problem if the software can recognize the file format.

On the other hand, in a case of a recording apparatus that uses a removable recording medium such as an optical disk, the recording medium is removed from the recording apparatus in some cases.

Accordingly, in a case where storage for a long term like several dozen years is necessary for use such as archiving, for example, it becomes impossible to read out data if maintenance of software for reading out the data, and an operating system for operating the software is kept performed, even if a recording medium on which the data is recorded still exists.

As a preparation for such a case, the format of a container file to be recorded on a recording medium desirably conforms to a standard that has been made open.

If the format conforms to a standard, the possibility of being able to read out the container file is high even if a different operating system is used, for example, and also it becomes possible to newly develop software as necessary because the format of the container file has been made open.

(1e-2. About Processes of Recording and Storage of Logical Object Table on Recording Medium)

In the table method mentioned above, there are problems as to when a logical object table on a memory is written back to a recording medium, and also in which format the logical object table is stored on the recording medium.

(1e-2-1. Problems of Method of Writing back Logical Object Table Collectively)

For example, in a case where a logical object table on a memory is written back to a removable recording medium such as an optical disk collectively only before a process of removing (unmounting) the removable recording medium such as the optical disk, there can be problems like the ones mentioned below.

That is, in a case writing is performed consecutively to the full capacity of an unused recording medium with high capacity, for example, with the capacity of several terabytes, the total number of logical objects is as large as several millions if it is assumed that the average size of logical objects is 10 kilobytes.

In order to retain entries for these logical objects on a logical object table table, a large memory space as large as several gigabytes is required.

In addition, operation of removing the recording medium becomes slow because it takes time to write back the logical object table to a disk.

Furthermore, it is necessary to refer to all headers which amount to several million headers in a recovery process at the time of occurrence of a fault, and the process time becomes longer.

(1e-2-2. Problem of Method of Writing Back Differences of Logical Object Table)

Figure 11:
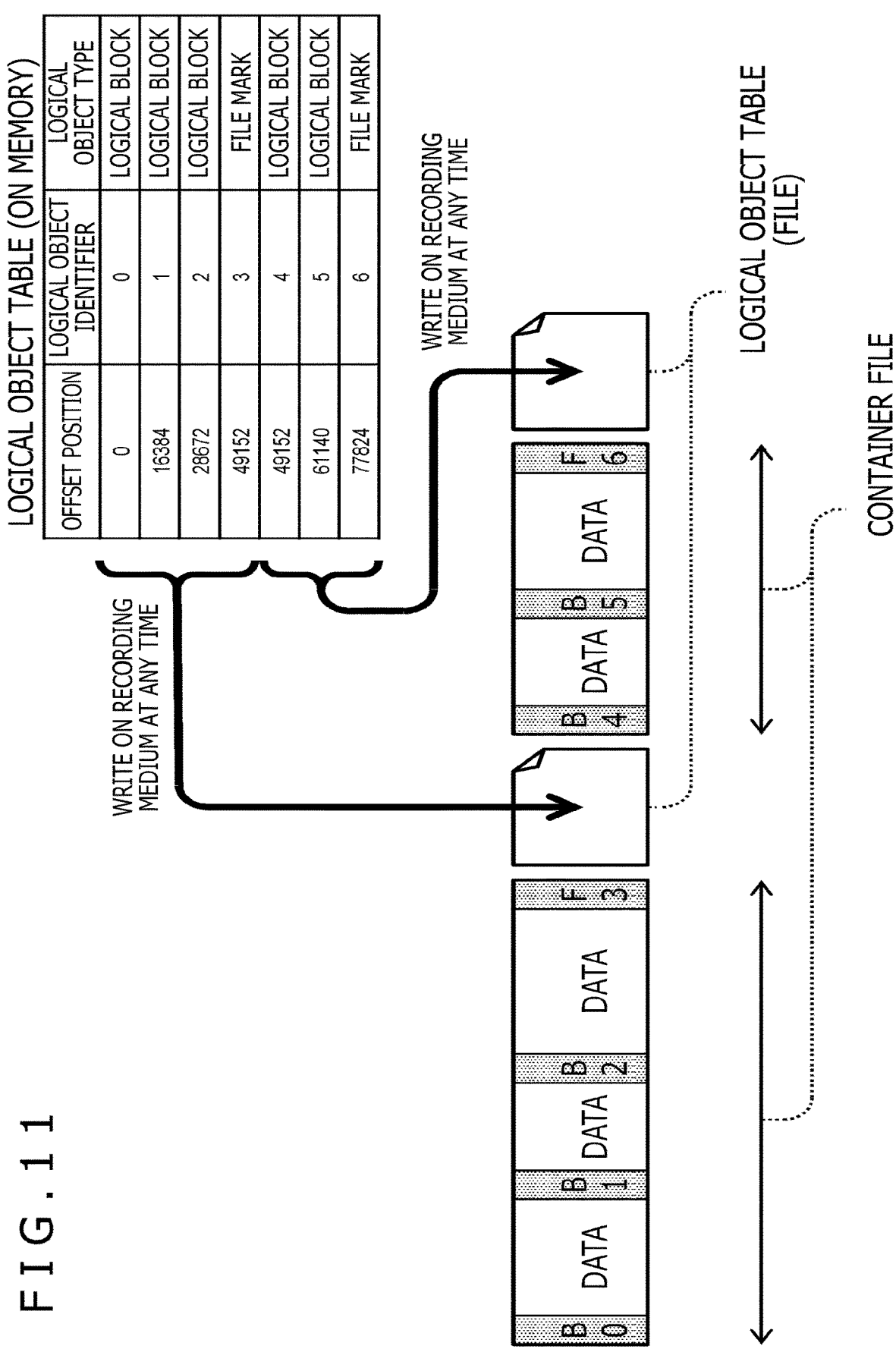
FIG. 11 is a figure for explaining a method in which logical object table differences are written back not only before a removable recording medium is removed but at any time.

As depicted in FIG. 11, in another possible method, not only before a removable recording medium is removed but also at any time, for example, after a certain amount of logical objects are recorded, only differences of a logical object table are written back.

In this case, because the number of entries in a logical object table that should be retained on a memory can be kept small, the memory consumption amount and the length of time for writing back can be kept small and short.

However, the logical object table is dispersed on the recording medium, and so, in order to search for target entries, it is necessary to refer to all dispersed pieces of logical object table information. Because of this, there is a drawback that it takes a long time at the time of mounting or at the time of a seek process.

[2. About Configuration and Processes of Archiving Apparatus of Present Disclosure]

Next, the configuration and processes of the archiving apparatus of the present disclosure are explained.

The archiving apparatus of the present disclosure is based on the method in which logical object table differences are written back at any time.

However, it should be noted however that, in this method, when a logical object table is searched for seek operation, not all, but only some of the pieces of logical object table information that are dispersed on a recording medium are referred to.

In order to realize this, it is necessary to determine where a portion at which an entry of a sought logical object is recorded is in pieces of logical object table information that are dispersed on a recording medium.

The archiving apparatus of the present disclosure realizes this by using directory information of a file system.

[2-1. About Configuration Example of Information Processing System of Present Disclosure]

Before processes to be executed by the archiving apparatus of the present disclosure are explained, first, a configuration example of an information processing system of the present disclosure is explained with reference to FIG. 12.

Figure 12:
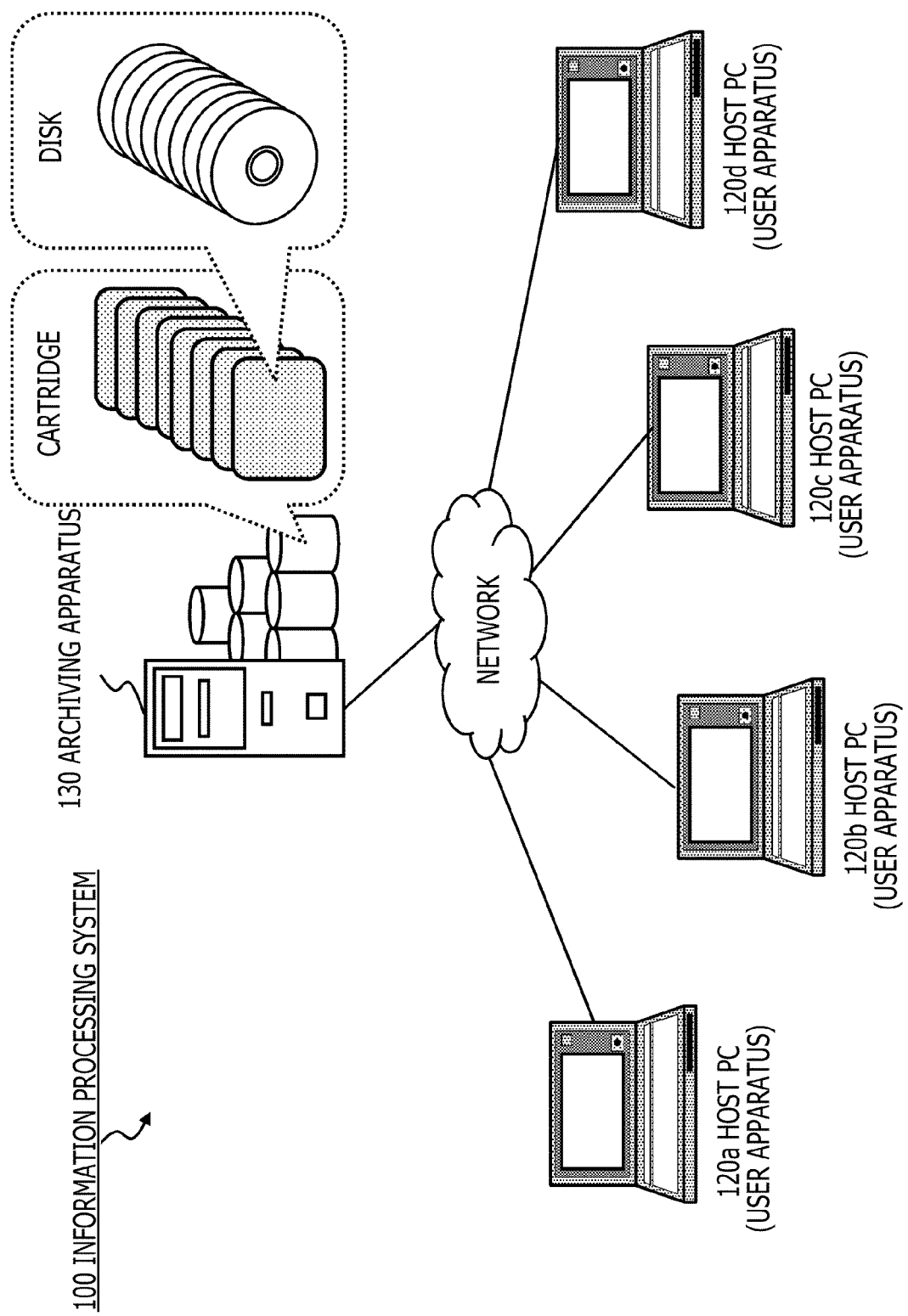
FIG. 12 is a figure for explaining a configuration example of an information processing system of the present disclosure.

FIG. 12 is a figure depicting the configuration example of an information processing system 100 of the present disclosure.

As explained with reference to FIG. 1 earlier, the information processing system 100 has a network-connected archiving apparatus 130 and plurality of host PCs (user apparatuses) 120.

For example, the archiving apparatus 130 has a large number of optical disks as recording media. Note that the recording media are not limited to optical disks but may be magnetic disks. In the present embodiment, a configuration example in which optical disks are used is explained as one example.

As depicted in the figure, the archiving apparatus 130 houses a large number of cartridges each housing a plurality of optical disks.

The archiving apparatus 130 is a high-capacity storage apparatus that records various types of data, for example, video data and the like, on the optical disks, and enables long-term storage of the recorded data.

Note that the configuration of the system of the present disclosure is not limited to a network-connected configuration depicted in FIG. 12 but may be, for example, a configuration which is similar to the configuration explained with reference to FIG. 3 earlier, that is, a configuration in which one host PC and one archiving apparatus are connected directly.

Figure 13:
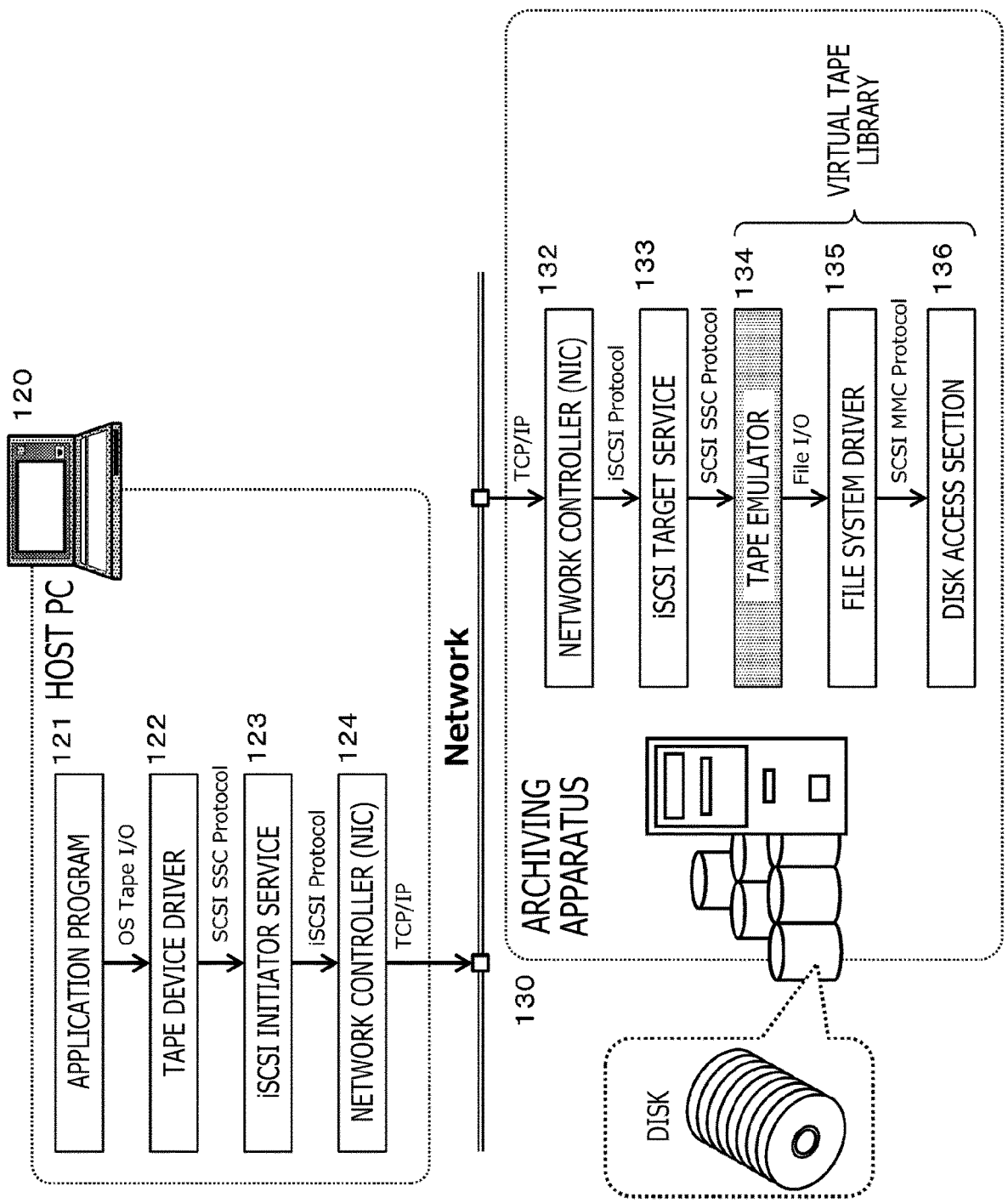
FIG. 13 is a figure for explaining internal configuration examples of the archiving apparatus and the host PC (user apparatus).

FIG. 13 is a figure depicting internal configuration examples of the archiving apparatus 130 and a host PC (user apparatus) 120 that are depicted in FIG. 12.

Constituent elements themselves of each apparatus depicted in FIG. 13 are similar to constituent elements explained with reference to FIG. 5 earlier.

That is, the host PC 120 has an application program 121, a tape device driver 122, an iSCSI initiator service 123, and a network controller (NIC) 124.

On the other hand, the archiving apparatus 130 has a network controller (NIC) 132, an iSCSI target service 133, a tape emulator 134, a file system driver 135, and a disk access section 136.

The application program 121 of the host PC 120 is an application that executes a process of recording data on a recording medium of the archiving apparatus 130, and a request to read out data from the recording medium. According to a request from the application program 121, the tape device driver 122 generates an SSC command according to the SCSI-SSC protocol.

The iSCSI initiator service 123 and the network controller (NIC) 124 of the host PC 120 generate transmission data for transmitting an SSC command according to the SCSI-SSC protocol generated by the tape device driver 122 to the archiving apparatus 130 via a network, and outputs the transmission data.

The network controller (NIC) 132 and the iSCSI target service 133 of the archiving apparatus 130 acquire the SSC command from the transmission data of the host PC 120, and outputs the SSC command to the tape emulator 134.

The tape emulator 134 interprets the tape-accessing commands (SSC commands) generated by the host PC 120 and converts the tape-accessing commands into disk-accessible commands. For example, the tape emulator 134 executes a process of conversion into commands such as SBC (SCSI Block Commands) or MMC (Multi-Media Commands) specified in the SCSI standard which are access commands of magnetic disk apparatuses or optical disk apparatuses, or other processes, and outputs the converted commands to the file system driver 135.

The file system driver 135 is a driver that enables use of a disk-accessing file system that uses SBC or MMC command sets which are disk-accessing commands, or the like. Disks are accessed at the disk access section 136 via the file system driver 135, and data recording and readout which are processes requested by the host PC 120 are executed.

The basic process flow is similar to the processes explained with reference to FIG. 5 earlier but the archiving apparatus 130 of the present disclosure executes new processes which are not seen in conventional techniques.

The archiving apparatus 130 of the present disclosure executes processes of generating a logical object table in which the types, logical object identifiers, and intra-container-file offset positions of logical objects which are unit data to be recorded on a medium are recorded, recording the logical object table on a memory, recording the table on a recording medium such as an optical disk from the memory, and so on. The process of recording the logical object table on the recording medium such as the optical disk from the memory is based on a method of writing back differences at any time.

Furthermore, in the configuration to be realized, for example, when operation of seeking a logical object that the host PC 120 requests to access is performed, it is possible to analyze the recording position of the target logical object by referring to not all but only some of pieces of logical object table information that are dispersed on the recording medium.

In order to realize this, it is necessary to determine where a portion at which an entry of a sought logical object is recorded is in pieces of logical object table information that are dispersed on a recording medium.

The archiving apparatus of the present disclosure realizes this by using directory information of a file system.

Figure 14:
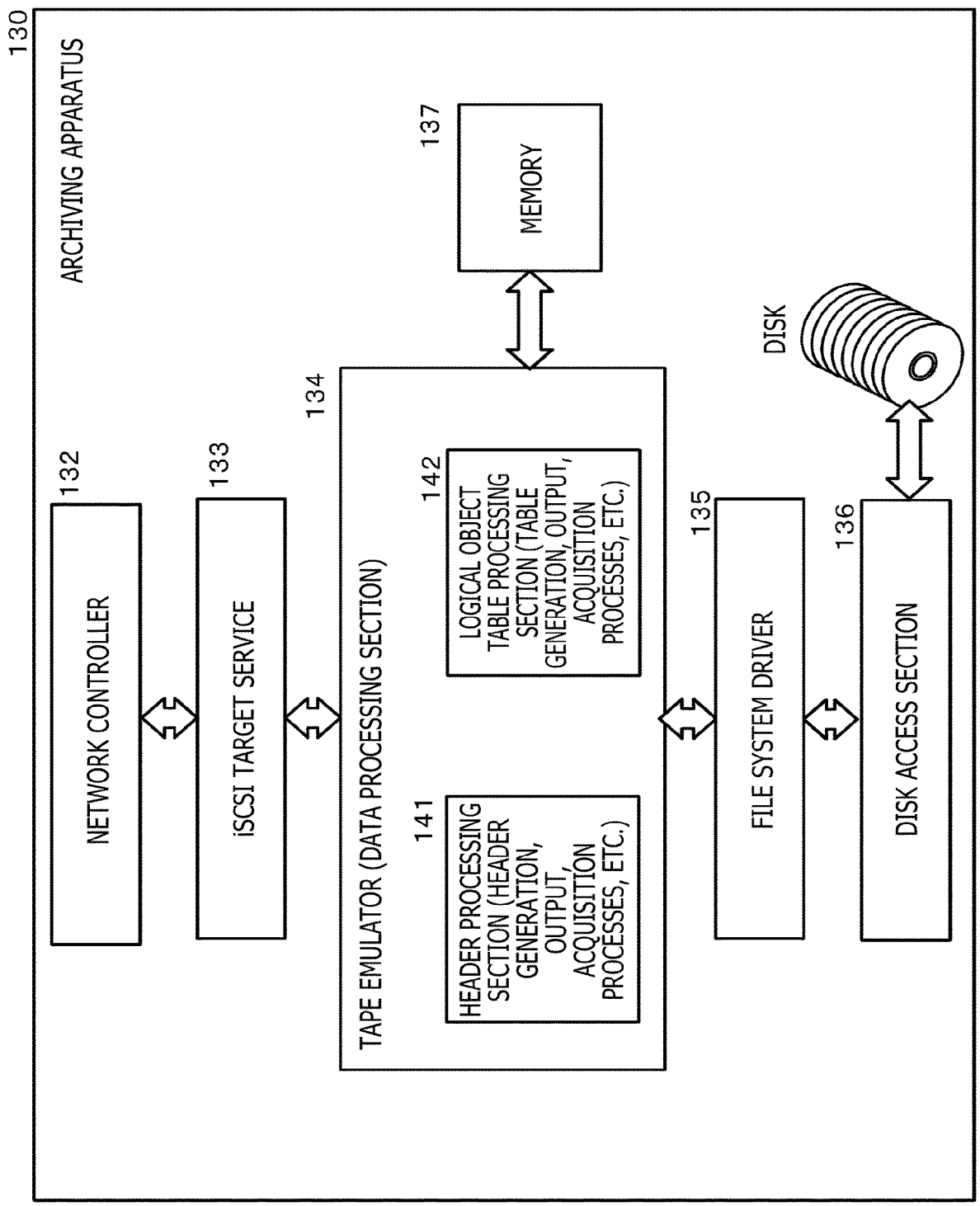
FIG. 14 is a figure for explaining a detailed configuration example of the archiving apparatus of the present disclosure.

FIG. 14 is a figure depicting a detailed configuration example of the archiving apparatus 130 of the present disclosure. The archiving apparatus 130 has the network controller (NIC) 132, the iSCSI target service 133, the tape emulator 134, the file system driver 135, the disk access section 136, and a memory 137.

The tape emulator 134 has a header processing section 141 and a logical object table processing section 142.

The header processing section 141 executes processes of generating header information of each logical object to be recorded on a disk, that is, a header including type information representing whether the logical object is a logical block or a file mark, the size and logical object identifier of the logical object, and the like, outputting the header information to the file system driver 135, reading out the header from a disk, and so on.

The logical object table processing section 142 executes processes of generating a logical object table in which the types, logical object identifiers, and intra-container-file offset positions of logical objects are recorded, writing the logical object table out on the memory 137, reading out the logical object table from the memory 1347, outputting the logical object table to the file system driver 135, reading out the logical object table from a disk, and so on.

Furthermore, the logical object table processing section 142 also executes processes of generating a container file table mentioned below, that is, a container file table which is a list of container files recorded on a recording medium such as an optical disk, recording the container file table on the memory, clearing the container file table, and so on.

Note that, although not depicted in the figure, the tape emulator 134 also executes a command emulation process similar to those in conventional techniques. That is, the tape emulator 134 interprets the tape-accessing commands (SSC commands) generated by the host PC 120 and converts the tape-accessing commands into disk-accessible commands. For example, the tape emulator 134 executes a process of conversion into commands such as SBC (SCSI Block Commands) or MMC (Multi-Media Commands) specified in the SCSI standard which are access commands of magnetic disk apparatuses or optical disk apparatuses, or other processes, and outputs the converted commands to the file system driver 135.

[2-2. About Details of Process of Recording Logical Object Table on Medium Executed by Archiving Apparatus of Present Disclosure]

Next, details of a process of recording a logical object table on a medium executed by the archiving apparatus 130 of the present disclosure are explained.

[2-2-1. Format of Container File]

Data processing sections of the archiving apparatus 130 of the present disclosure, for example, data processing sections such as the tape emulator 134, execute a process of recording a logical object table recorded on the memory of the archiving apparatus 130 on a recording medium such as an optical disk.

Figure 15:
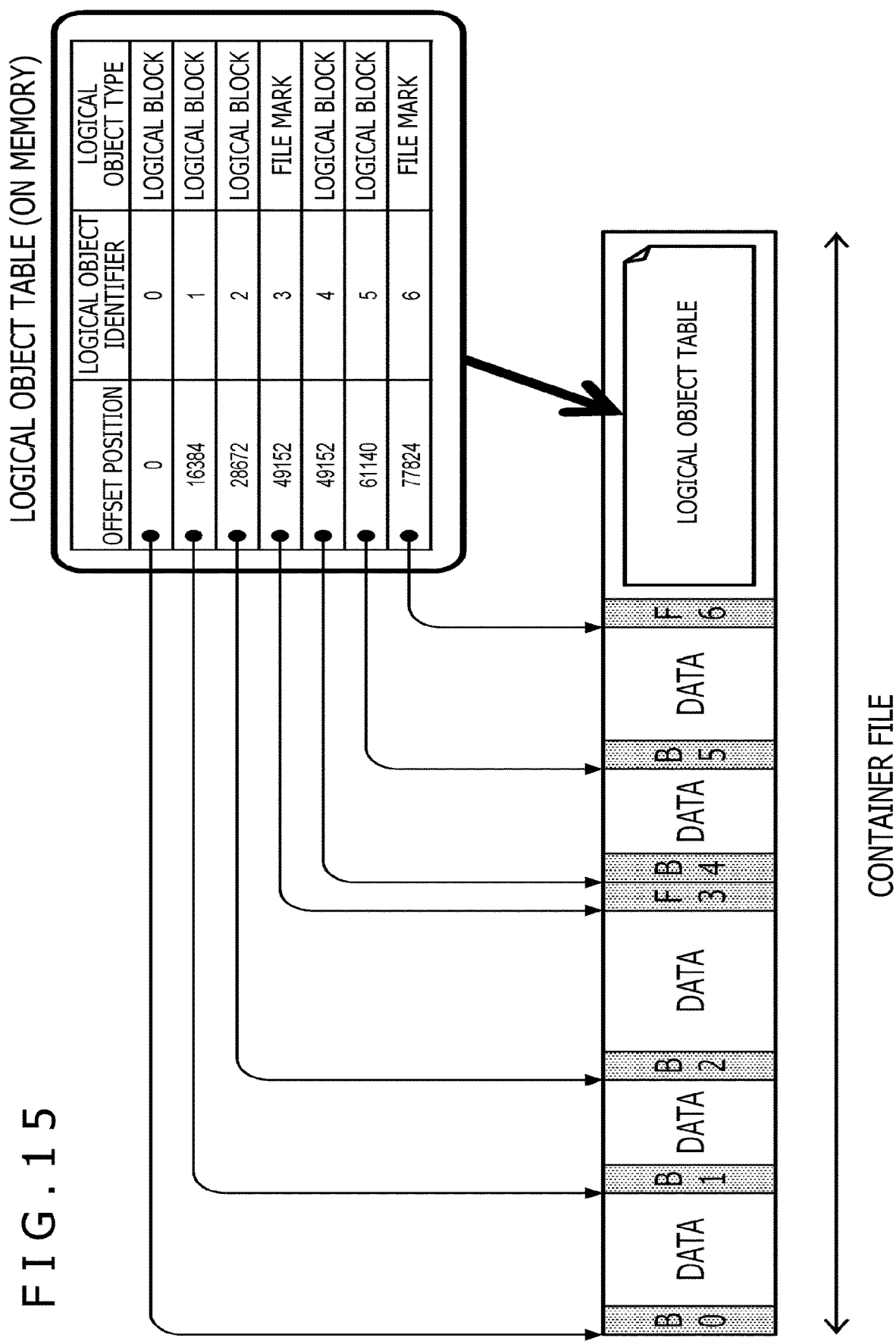
FIG. 15 is a figure for explaining a method in which a header method and a table method are used in combination, and a logical object table is incorporated at the end of a container file.

As depicted in FIG. 15, in a format adopted here, a header method and a table method explained earlier are used in combination, and a logical object table is incorporated at the end of a container file.

As depicted in FIG. 15, the type and logical object identifier of each logical object recorded on the recording medium, and the offset position from the beginning of the container file to which the logical object belongs are described in the logical object table.

This logical object table is recorded on the memory while the recording medium such as the optical disk is left mounted, and is transcribed onto the recording medium when the recording medium is unmounted.

For example, when a certain container file is closed at the time of data recording on the container file, the container file is closed after a logical object table for all logical objects in the container file is added at the end of the container file.

Note that the closing process in the present disclosure mainly means that rewriting and appending will no longer be performed on the file permanently thereafter, but the closing process may not necessarily mean that rewriting and appending will no longer be performed permanently, but may mean that rewriting and appending will not be performed for a predetermined period.

Figure 16:
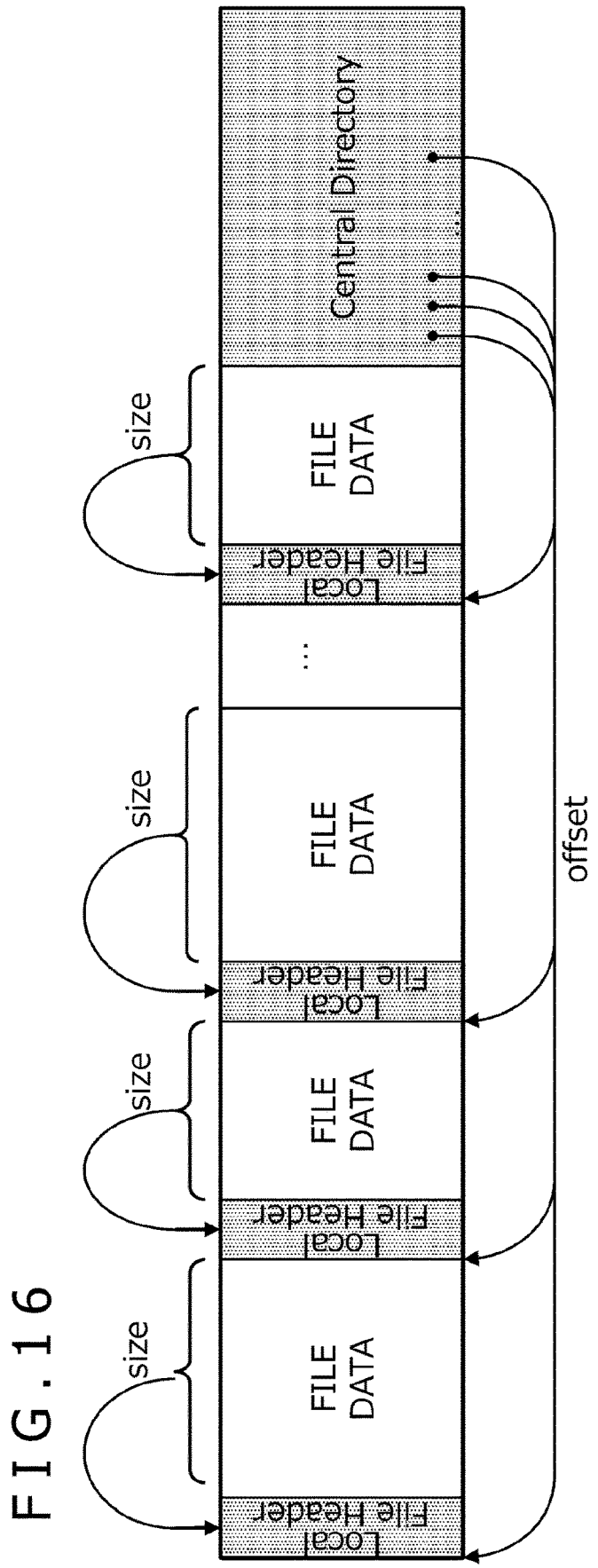
FIG. 16 is a figure for explaining the ZIP format.

As the container file format, the ZIP format can be used. In the ZIP format, as depicted in FIG. 16, there are Local File Headers equivalent to the headers mentioned before, and Central Directory equivalent to the logical object table mentioned before, and so they can be used for a container file.

In a case where the ZIP format is used as the container file format, logical objects are equivalent to files in a ZIP file. File names in the ZIP file are strings formed by combining the logical object identifiers and logical file identifiers of the logical objects by using connectors.

[2-2-2. Division of Container File]

Figure 17:
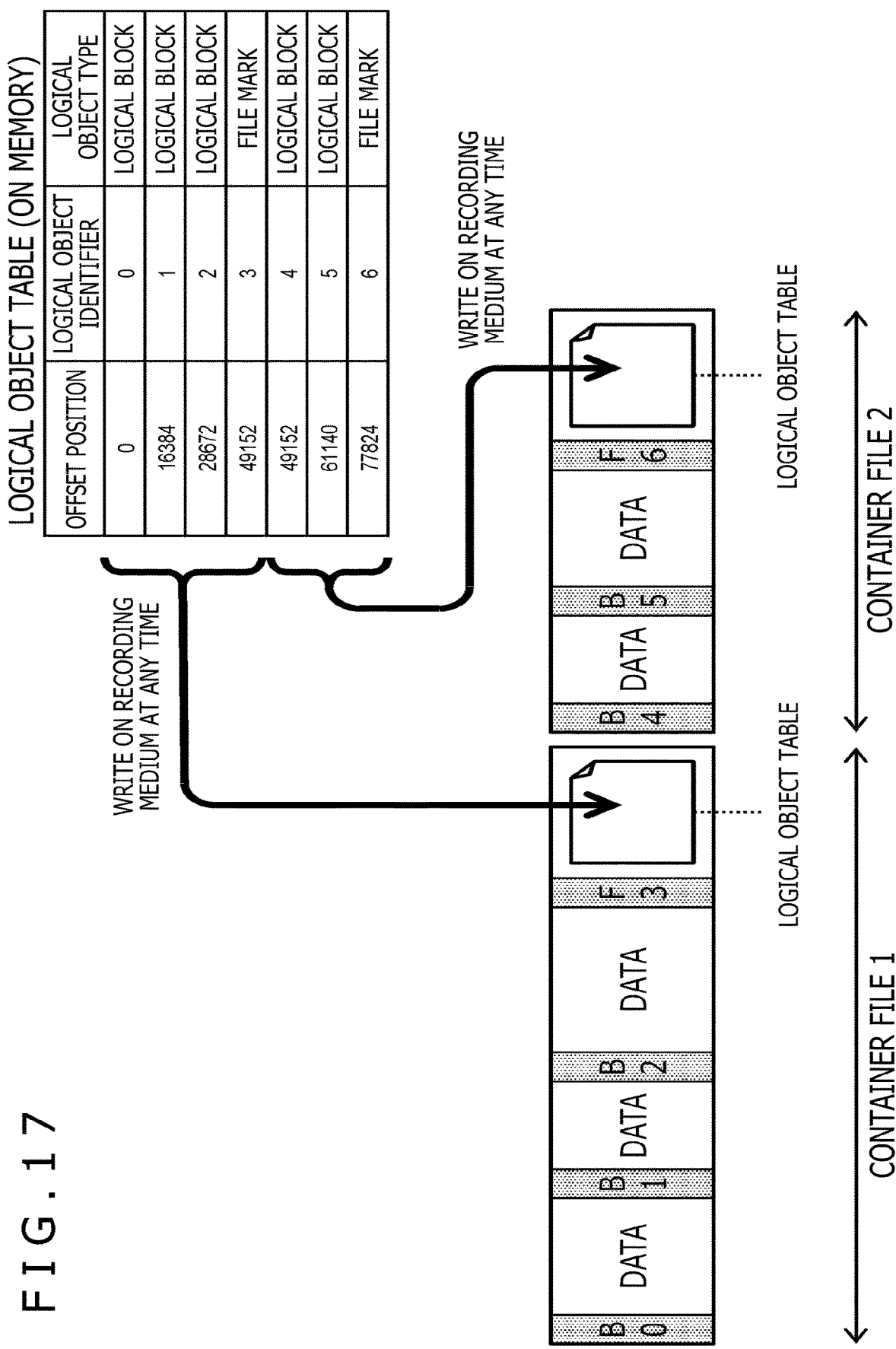
FIG. 17 is a figure for explaining a method in which a plurality of container files is used to express a logical object group in a tape.

In the configuration of the present disclosure, as depicted in FIG. 17, a plurality of container files is used to express a plurality of logical object groups.

A container file on which recording is being performed is temporarily closed at the following four time points, and in a case where the recording is to be continued, the recording is performed on a newly created container file.

(First Time Point) Immediately before a removable medium is removed (unmounted) from a recording apparatus (Second Time Point) At a time point when the size of a container file on which recording is being performed has exceeded a preset reference value (Third Time Point) At a time point when the logical object count of a container file on which recording is being performed has exceeded a preset reference value (Fourth Time Point) At a time point when the free space of a disk on which recording is being performed in a removable medium having a plurality of optical disks in a cartridge has fallen below a preset reference value The first time point is immediately before a removable medium is removed from a recording apparatus.

As mentioned before, a logical object table is recorded at the end of a container file, and so the logical object table of all logical objects recorded in the container file is recorded on the removable medium removed from the recording apparatus.

The second time point is a time point when the size of a container file on which recording is being performed has exceeded a preset reference value.

For example, if the size of a container file is restricted to be smaller than 4 gibibytes (i.e. 4×230 bytes), offset information in each entry of the logical object table can be expressed by 32 bits, and the size of the logical object table can be kept small.

The third time point is a time point when the logical object count of a container file on which recording is being performed has exceeded a preset reference value.

Thereby, the consumption amount of the memory used by the logical object table can be made equal to or smaller than a certain amount.

The fourth time point is a time point when the free space of a disk on which recording is being performed in a removable medium having a plurality of optical disks in a cartridge has fallen below a preset reference value.

Thereby, a container file will never be recorded on different disks. That is, logical blocks and a logical object table in the container file are recorded on a single disk. Accordingly, delays due to switching of disks will not occur when logical blocks are accessed after the logical object table is referred to.

[2-2-3. Name of Container File]

As a name of a container file, the archiving apparatus 130 of the present disclosure sets a file name including the following four values.

(1) First logical object ID (FIRST_LOID)
(2) First logical file ID (FIRST_LFID)
(3) Contents logical object count (N_LO)
(4) Contents file mark count (N_FM)

First, a logical object ID (identifier) of the first logical object included in the container file. Hereinafter, this is called FIRST_LOID.

Second, in a case where the first logical object included in the container file is a logical block, an ID (identifier) of a logical file to which the logical block belongs. Alternatively, in a case where the first logical object included in the container file is a file mark, a logical file ID (identifier) of a logical file immediately before the file mark. Hereinafter, this is called FIRST_LFID.

Third, the number of logical objects included in the container file. Hereinafter, this is called N_LO.

Fourth, the number of file marks included in the container file. Hereinafter, this is called N_FM.

For example, in a container file like the one depicted in FIG. 18,
the first logical object ID (identifier)=0,
the ID (identifier) of the logical file to which the first logical object belongs=0,
the number of logical objects included in the container file=3, and
the number of file marks included in the container file=1.

Figure 19:
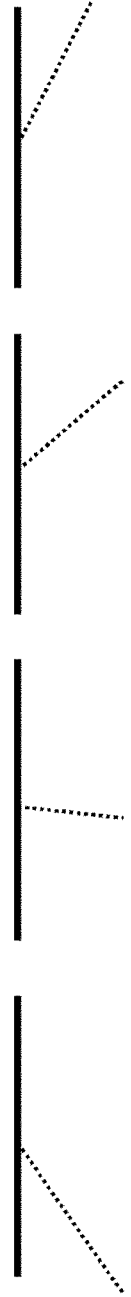
FIG. 19 is a figure for explaining a file name of a container file.

Accordingly, if these are expressed by fixed numbers of digits, and underbars are used as the connector, the file name becomes a file name like the one depicted in FIG. 19, that is, File name=00000000_00000000_00000003_00000001.

Putting it in the other way around, from the file name of a container file, it is possible to obtain the first logical object identifier in the container file, the logical file identifier to which the first logical object belongs, the number of logical objects included in the container file, and the number of file marks included in the container file.

Thereby, it is possible to decide whether or not a logical object having a certain logical object identifier is included in the container file.

That is, assuming that the value of an identifier of a certain search-target logical object is TAR_LOID, if the following (criterion formula 1), that is, $$\text{FIRST\_LOID} \leq \text{TAR\_LOID} < \text{FIRST\_LOID} + \text{N\_LO} \quad \text{(criterion formula 1)}$$

the (criterion formula 1) described above is satisfied, it can be determined that the search-target logical object is included in the container file.

In addition, assuming that the logical file identifier of the logical file immediately before a certain search-target file mark is TAR_LFID, if the following (criterion formula 2), that is, $$\text{FIRST\_LFID} \leq \text{TAR\_LFID} < \text{FIRST\_LFID} + \text{N\_FM} \quad \text{(criterion formula 2)}$$

the (criterion formula 2) described above is satisfied, it can be determined that the search-target file mark is included in the container file.

[2-2-4. Container File Table]

The archiving apparatus of the present disclosure manages, on the memory, a list of container files on a recording medium as a container file table like the one depicted in FIG. 20.

When the recording medium is mounted, the container file table depicted in FIG. 20 is created on the basis of file names obtained from directory information of a file system.

The directory information is recorded on the recording medium, and a data processing section 134 can refer to the directory information by acquiring it via the file system driver 135.

The file name of each container file, that is, a file name including data similar to that explained with reference to FIG. 19, is recorded in the directory information.

Note that each entry of the container file table depicted in FIG. 20 has information corresponding to one container file.

As depicted in FIG. 20, the container file table is a table in which, for each of container files on the recording medium, each piece of data of (1) a first logical object ID (FIRST_LOID),
(2) a first logical file ID (FIRST_LFID),
(3) a contents logical object count (N_LO), and
(4) a contents file mark count (N_FM) is recorded.

Note that each piece of the data described above corresponds to configuration data of a container file name.

The container file table depicted in FIG. 20 is not written back to a recording medium in its original form in any case. It is written back to the recording medium as file system data by generating a file name of a container file from each piece of entry information in the container file table.

[2-2-5. Advantage effects of Configuration of Present Disclosure]

By using the configuration of the present disclosure, a disk-mounted archiving apparatus that operates with small memory usage, and can shorten mounting time or seeking time, for example, the archiving apparatus 130 that has removable recording media such as optical disks as recording media, can be realized.

Note that because the archiving apparatus 130 of the present disclosure sequentially performs a process of writing container files in disks, and does not generate fragments, the archiving apparatus 130 of the present disclosure can be applied to a configuration that uses a write-once-read-many optical disk apparatus that requires sequential writing.

Furthermore, by using the standard ZIP format as the format of container files, recorded contents can be reconstructed by using a generally-used ZIP decompression program even in a case where it becomes difficult to perform maintenance of tape emulators in the future.

[3. About Sequences of Processes Executed by Archiving Apparatus of Present Disclosure]

Next, sequences of processes executed by the archiving apparatus of the present disclosure are explained.

As the sequences of processes executed by the archiving apparatus of the present disclosure, the following processes are explained sequentially.

(Process 1) Unused recording medium mounting process (Process 2) Logical block appending process (Process 3) File mark addition process (Process 4) Process to be performed in a case where the size of a container file has reached an end reference value (Process 5) Process to be performed in a case where the logical object count of a container file has reached an upper limit (Process 6) Process to be performed in a case where the free space of a disk on which recording is being performed has fallen below a reference value (Process 7) Process to be performed at the time of unmounting (Process 8) Recorded medium mounting process (Process 9) Process to be performed at the time of seeking

[3-1. (Process 1) Unused Recording Medium Mounting Process]

First, a sequence of a process to be performed by the archiving apparatus 130 of the present disclosure when an unused recording medium such as an optical disk is mounted (attached) is explained with reference to a flowchart depicted in FIG. 21.

Note that processes according to flowcharts explained below can be executed according to a program stored on a storage section of the archiving apparatus 130, and, for example, can be executed under the control of a data processing section having a processor such as a CPU having a program execution functionality.

Figure 21:
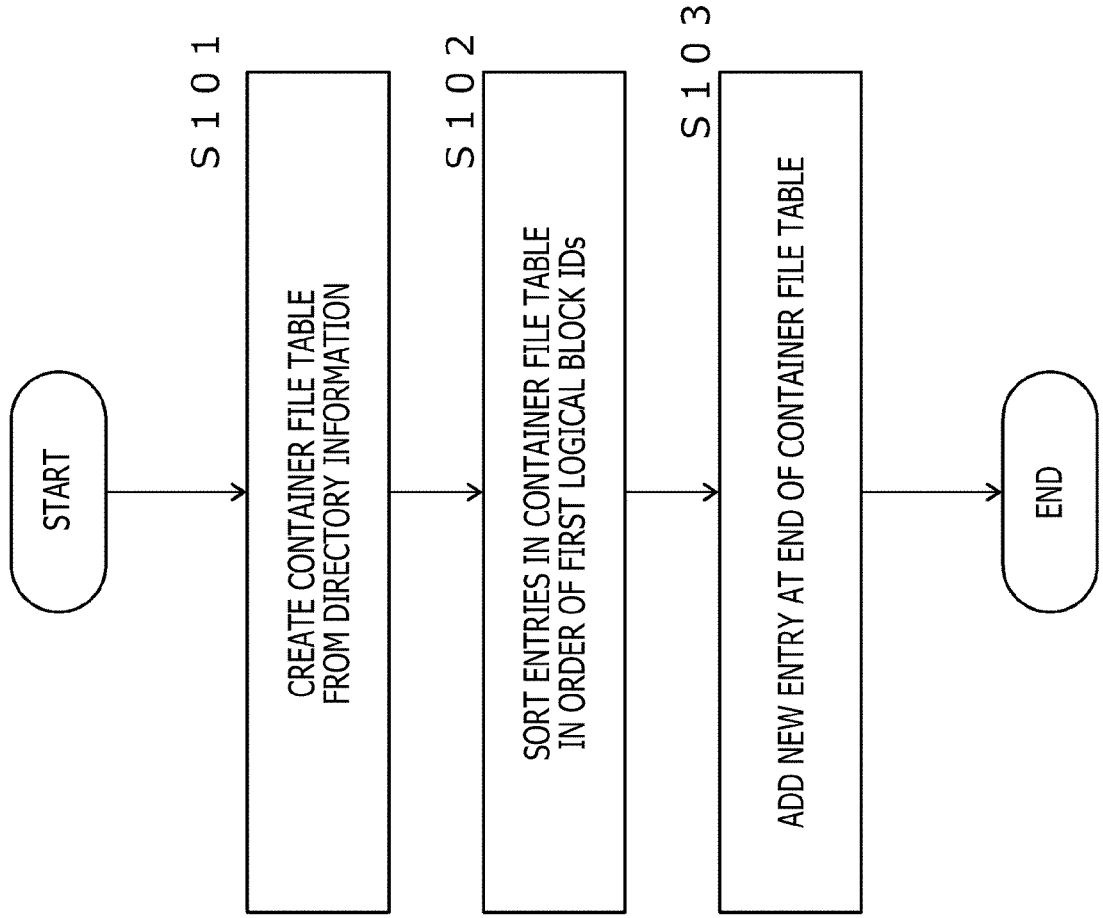
FIG. 21 is a figure depicting a flowchart for explaining a sequence of a process to be performed by the archiving apparatus of the present disclosure when an unused recording medium such as an optical disk is mounted (attached).

A process at each step of the flowchart depicted in FIG. 21 is explained.

(Step S101)

First, at Step S101, the data processing section of the archiving apparatus of the present disclosure calls a file system API, acquires a container file list on the recording medium being mounted, and loads the container file list as a container file table onto the memory.

That is, the container file table depicted in FIG. 20 is created on the basis of file names obtained from directory information of a file system. As mentioned before, the directory information is recorded on the recording medium, and the data processing section can acquire the directory information via the file system driver.

The file name of each container file, that is, a file name including data similar to that explained with reference to FIG. 19, is recorded in the directory information.

Note that the file system API used here differs depending on an OS used.

For example, in a Windows OS, the FindFirstFile( ) function and the FindNextFile( ) function are used.

In addition, in a POSIX OS such as Linux (registered trademark), the readdir( ) function can be used.

The data processing section of the archiving apparatus of the present disclosure uses these functions to acquire the container file list (directory information) on the recording medium.

The container file list to be acquired is a list of container file names. That is, those are container file names like the one explained with reference to FIG. 19, and the file name of each container file includes the four types of data which are the first logical object ID (identifier), the ID (identifier) of the logical file to which the first logical object belongs, the number of logical objects included in the container file, and the number of file marks included in the container file.

The data processing section of the archiving apparatus of the present disclosure acquires the container file names of container files having been recorded on the recording medium such as an optical disk being mounted, and records the container file names as a container file table on the memory.

The container file table is created as a container file table including the data explained with reference to FIG. 20 earlier, and is recorded on the memory.

Each entry of the container file table depicted in FIG. 20 has information corresponding to one container file.

(Step S102)

At the next Step S102, the data processing section of the archiving apparatus of the present disclosure sorts the container file table recorded on the memory in ascending order of first logical block identifiers.

Note that because no container files have been recorded on the unused recording medium yet, the container file table is empty.

(Step S103)

Next, at Step S103, the data processing section of the archiving apparatus of the present disclosure newly adds an entry at the end of the container file table recorded on the memory.

The newly added entry is an entry corresponding to a container file for storing logical objects to be recorded thereafter.

However, it should be noted however that the container file has not been created yet at this time point.

This ends the unused recording medium mounting process.

[3-2. (Process 2) Logical Block Appending Process]

Next, a sequence of a process to be performed by the archiving apparatus 130 of the present disclosure to append a new logical block to a recording medium such as an optical disk is explained with reference to a flowchart depicted in FIG. 22.

Figure 22:
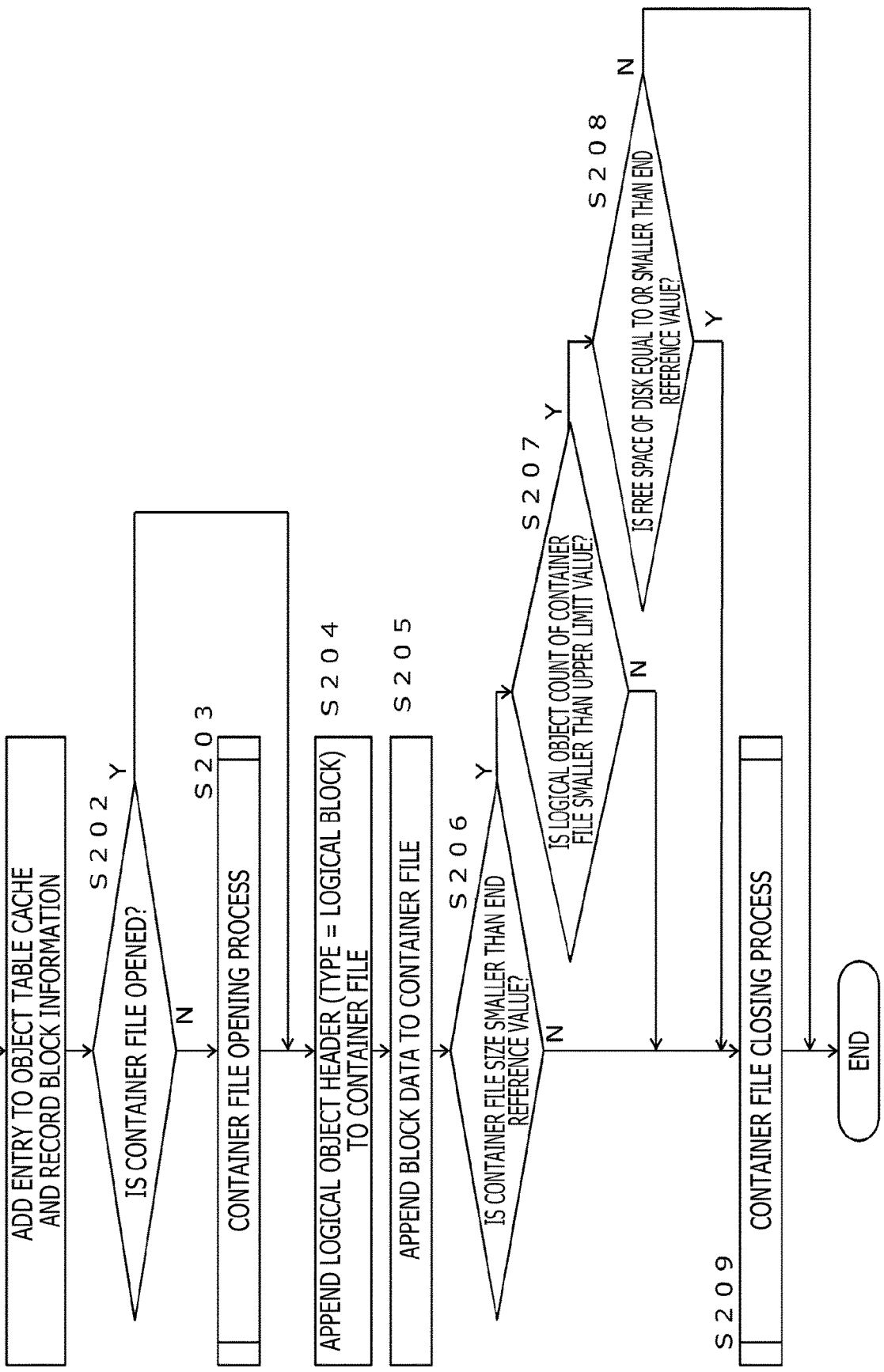
FIG. 22 is a figure depicting a flowchart for explaining a sequence of a process to be performed by the archiving apparatus of the present disclosure to append a new logical block to a recording medium such as an optical disk.

The flowchart depicted in FIG. 22 is a flowchart of processes to be performed in a case where one logical block is appended to the unused recording medium, as processes to be performed in response to a WRITE command issued from the host PC.

Hereinafter, a process at each step of the flow depicted in FIG. 22 is explained sequentially.

(Step S201)

First, at Step S201, the data processing section of the archiving apparatus of the present disclosure adds an entry to the logical object table on the memory, and records information such as the type of a logical object to be recorded on the disk, that is, identification information representing that the logical object is a logical block, a logical object identifier, a logical file identifier, or an offset position on a container file.

Note that because this process example is about the first writing on the unused recording medium, one entry including logical object identifier=0, offset position=0, and logical object type=logical block, set as described above is added in the logical object table on the memory as depicted in FIG. 23.

(Step S202)

Next, at Step S202, the data processing section of the archiving apparatus of the present disclosure checks whether or not the write-in destination container file is opened, and in a case where the write-in destination container file has not been opened, the data processing section of the archiving apparatus of the present disclosure proceeds to Step S203 and performs a container file opening process.

Note that because the container file has not been opened yet at the time of the first recording on the unused recording medium, it is necessary to perform the container file opening process.

A sequence of the container file opening process is explained with reference to a flowchart depicted in FIG. 24.

(Step S301)

At Step S301, first, the data processing section of the archiving apparatus of the present disclosure generates a file name of the container file from an entry at the end of the container file table recorded on the memory.

As explained with reference to FIG. 19 earlier, for example, the rule of generation of file names conforms to the format including the logical object identifier of the first logical object included in the container file, the logical file identifier of the logical file to which the logical object belongs, and the number of logical objects and number of file marks included in the container file.

Because no logical objects have been recorded on the unused recording medium at the time of the first recording on the unused recording medium yet, the container file name to be generated is

00000000_00000000_00000000_00000000.

(Step S302)

Next, at Step S302, the data processing section of the archiving apparatus of the present disclosure uses the generated file name to call a file system API and performs a new file creation/opening process.

The file system API to be used here is, for example, the CreateFile( ) function in a Windows OS, and also is the open( ) function in a POSIX OS such as Linux (registered trademark).

(Step S204)

Returning to the flow of FIG. 22, the explanation of the sequence of the process of appending a new logical block on the recording medium such as the optical disk is continued.

In a case where it is decided at Step S202 that the container file has been opened, or after the container file opening process at Step S203 is completed, the process proceeds to Step S204.

At Step S204, the data processing section of the archiving apparatus of the present disclosure records a logical object header on the recording medium.

The logical object header includes type information representing that a logical object to be recorded is a logical block.

In addition, the logical object header includes size information of the logical object to be recorded.

(Step S205)

After the header recording at the Step S204 is completed, at Step S205, the data processing section of the archiving apparatus of the present disclosure records a logical block data that the host PC has requested to record, on the recording medium continuously with the recorded header area.

(Step S206)

Subsequently, at Step S206, the data processing section of the archiving apparatus of the present disclosure checks the size of the container file after the header, and the logical block data are recorded.

In a case where it is decided that the size of the container file is equal to or larger than a prescribed container file end reference value, the process proceeds to Step S209.

On the other hand, in a case where it is decided that the size of the container file is smaller than the prescribed container file end reference value, the process proceeds to Step S207.

(Step S207)

In a case where it is decided at Step S206 that the size of the container file is smaller than the prescribed container file end reference value, at Step S207, the data processing section of the archiving apparatus checks the logical object count of the container file.

In a case where the logical object count of the container file has reached a prescribed upper limit (end reference value), the process proceeds to Step S209.

On the other hand, in a case where the logical object count of the container file has not reached the prescribed upper limit (end reference value) (smaller than the end reference value), the process proceeds to Step S208.

(Step S208)

In a case where, at Step S207, the logical object count of the container file has not reached the prescribed upper limit (end reference value) (smaller than the end reference value), at Step S208, the data processing section of the archiving apparatus checks the free space of the disk on which recording is being performed.

In a case where the free space is equal to or smaller than a prescribed reference value (end reference value), the process proceeds to Step S209.

On the other hand, in a case where the free space is not equal to or smaller than the prescribed reference value (end reference value), the processes of the flow are ended without executing the process at Step S209.

(Step S209)

The process at Step S209 is executed in any of the following cases, (1) in a case where it is decided at Step S206 that the size of the container file is equal to or larger than the prescribed container file end reference value, (2) in a case where it is decided at Step S207 that the logical object count of the container file has reached the prescribed upper limit (end reference value), (3) in a case where it is decided at Step S208 that the free disk space is equal to or smaller than the prescribed reference value (end reference value).

In any of the cases (1) to (3) described above, at Step S209, the data processing section of the archiving apparatus executes a container file closing process and ends the processes.

Note that also in a case where a logical block appending process is performed, the processes according to the flow depicted in FIG. 22 are executed.

Figure 24:
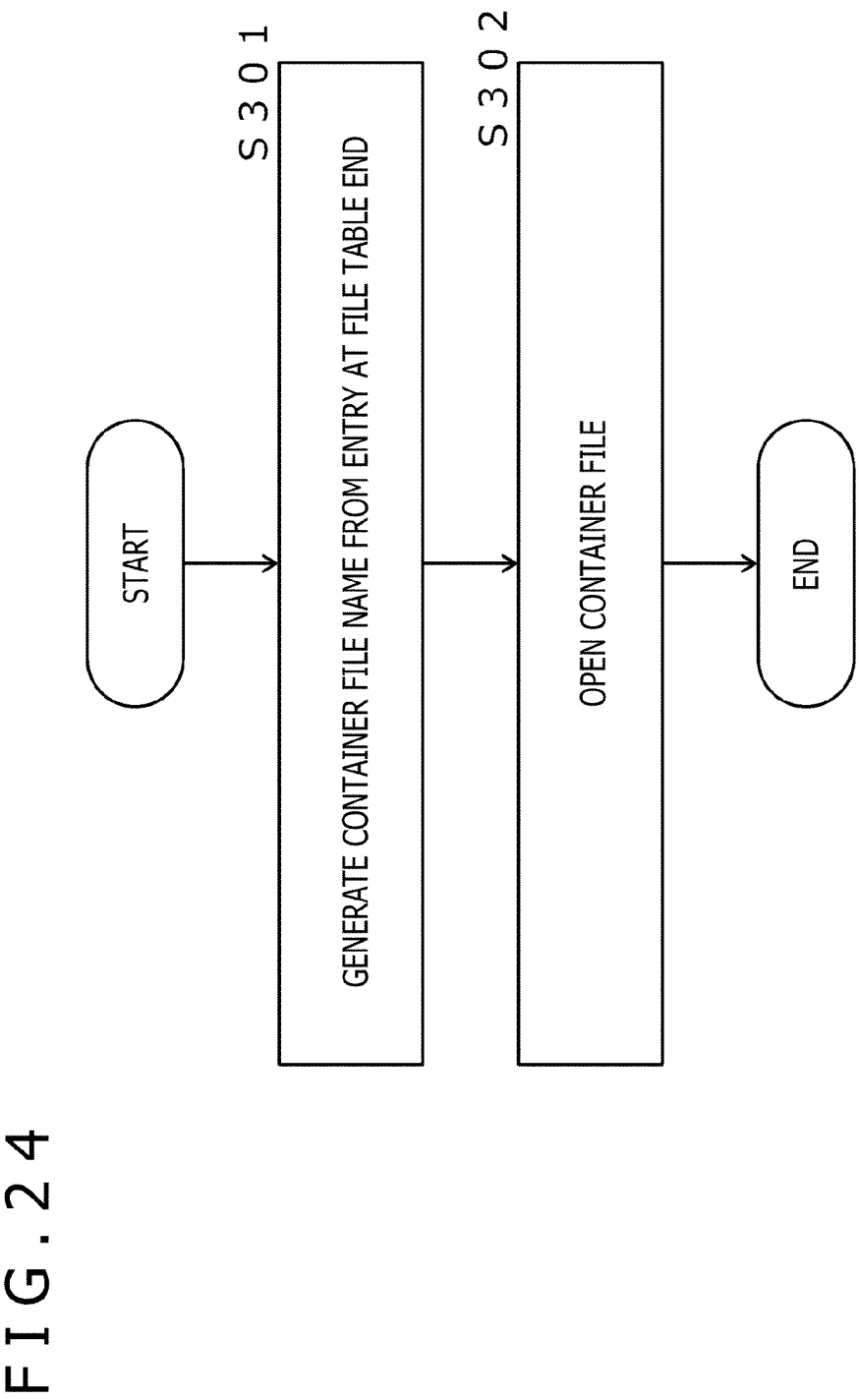
FIG. 24 is a figure depicting a flowchart for explaining a sequence of a container file opening process.

However, it should be noted however that because the container file has already been opened at the time point of Step S202 in a case where the logical block appending process is performed, the container file opening process in the flow depicted in FIG. 24 explained earlier is not performed.

[3-3. (Process 3) File Mark Appending Process]

Next, a sequence of a process to be performed by the archiving apparatus 130 of the present disclosure to append a new file mark to a recording medium such as an optical disk is explained with reference to a flowchart depicted in FIG. 25.

Figure 25:
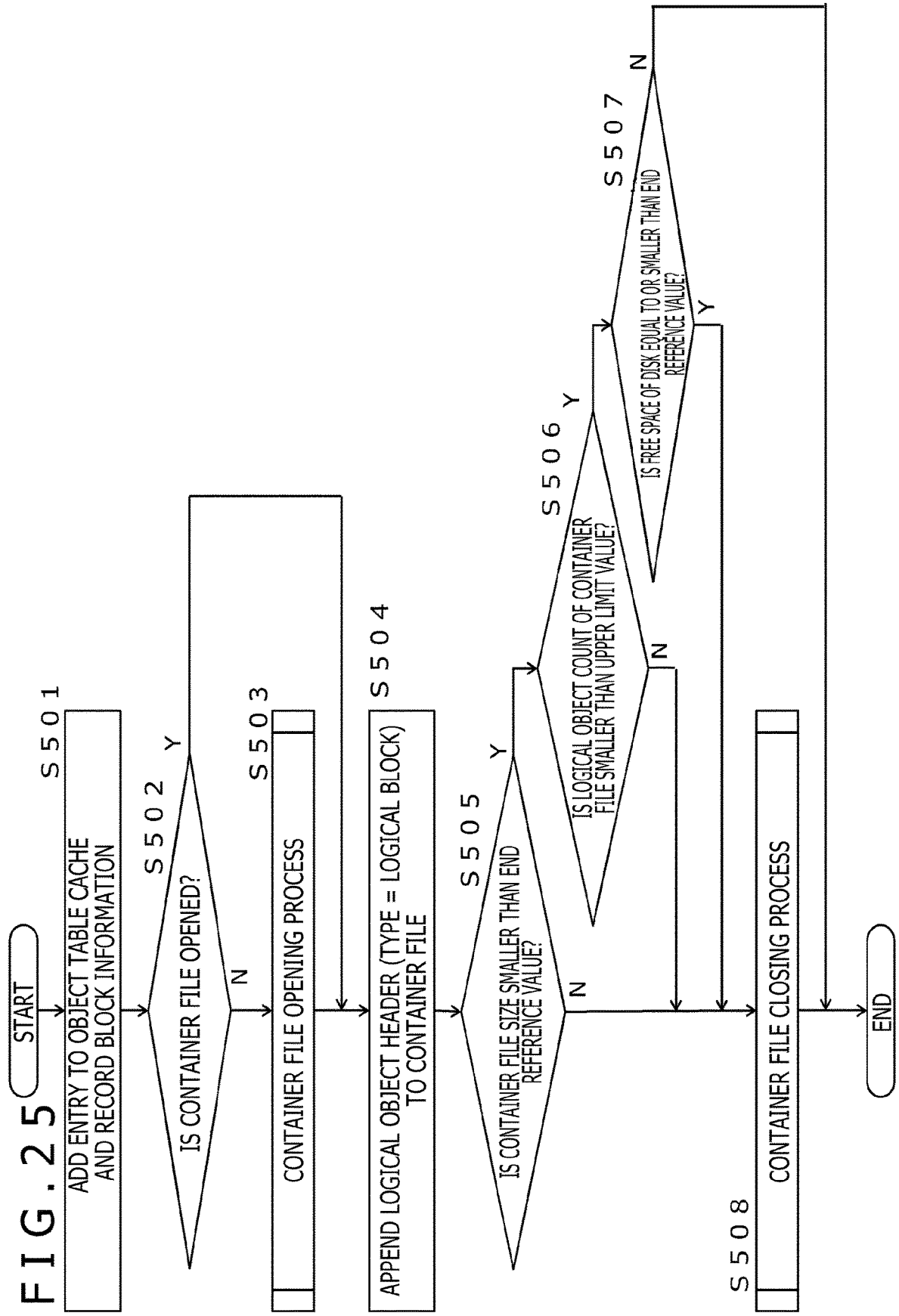
FIG. 25 is a figure depicting a flowchart for explaining a sequence of a process to be performed by the archiving apparatus of the present disclosure to append a new file mark to a recording medium such as an optical disk.

Hereinafter, a process at each step of the flow depicted in FIG. 25 is explained sequentially.

(Step S501)

First, at Step S501, the data processing section of the archiving apparatus of the present disclosure adds an entry to the logical object table loaded onto the memory, and records information such as the type of a logical object to be recorded, that is, identification information representing that the logical object is a file mark, a logical object identifier, a logical file identifier, an offset position on a container file, or the like.

(Step S502)

Next, at Step S502, the data processing section of the archiving apparatus of the present disclosure checks whether or not the write-in destination container file is opened, and in a case where the write-in destination container file has not been opened, the data processing section of the archiving apparatus of the present disclosure proceeds to Step S503 and performs a container file opening process.

The container file opening process is a process similar to the container file opening process at Step S203 in the logical block appending process explained with reference to the flow of FIG. 22 earlier. That is, it is a process which is the same as the process explained with reference to the flow of the FIG. 24 earlier.

(Step S504)

In a case where it is decided at Step S502 that the container file has been opened, or after the container file opening process at Step S503 is completed, the process proceeds to Step S504.

At Step S504, the data processing section of the archiving apparatus of the present disclosure records a logical object header on the recording medium.

The logical object header includes type information representing that a logical object to be recorded is a file mark.

In addition, the logical object header includes size information of the logical object to be recorded. However, it should be noted however that because file marks do not have real data, the size of the logical object is 0.

(Step S505)

Subsequently, at Step S505, the data processing section of the archiving apparatus of the present disclosure checks the size of the container file after the header and the logical block data are recorded.

In a case where it is decided that the size of the container file is equal to or larger than a prescribed container file end reference value, the process proceeds to Step S508.

On the other hand, in a case where it is decided that the size of the container file is smaller than the prescribed container file end reference value, the process proceeds to Step S506.

(Step S06)

In a case where it is decided at Step S505 that the size of the container file is smaller than the prescribed container file end reference value, at Step S506, the data processing section of the archiving apparatus checks the logical object count of the container file.

In a case where the logical object count of the container file has reached a prescribed upper limit (end reference value), the process proceeds to Step S508.

On the other hand, in a case where the logical object count of the container file has not reached the prescribed upper limit (end reference value) (smaller than the end reference value), the process proceeds to Step S507.

(Step S507)

In a case where, at Step S506, the logical object count of the container file has not reached the prescribed upper limit (end reference value) (smaller than the end reference value), at Step S507, the data processing section of the archiving apparatus checks the free space of the disk on which recording is being performed.

In a case where the free space is equal to or smaller than a prescribed reference value (end reference value), the process proceeds to Step S508.

On the other hand, in a case where the free space is not equal to or smaller than the prescribed reference value (end reference value), the processes of the flow are ended without executing the process at Step S508.

(Step S508)

The process at Step S508 is executed in any of the following cases, (1) in a case where it is decided at Step S505 that the size of the container file is equal to or larger than the prescribed container file end reference value, (2) in a case where it is decided at Step S506 that the logical object count of the container file has reached the prescribed upper limit (end reference value), (3) in a case where it is decided at Step S507 that the free disk space is equal to or smaller than the prescribed reference value (end reference value).

In any of the cases (1) to (3) described above, at Step S508, the data processing section of the archiving apparatus executes a container file closing process, and ends the processes

[3-4. (Process 4) Process to be Performed in Case where Size of Container File has Reached End Reference Value]

Next, a sequence of a process to be performed by the archiving apparatus 130 of the present disclosure in a case where the size of the container file has reached the end reference value while executing data recording on the recording medium such as the optical disk is explained with reference to the flowchart depicted in FIG. 26.

In a case where it is decided that the size of the container file has become equal to or larger than the end reference value at Step S206 in the flow of the logical block appending process explained with reference to FIG. 22 earlier, or at Step S505 in the flow of the file mark appending process explained with reference to FIG. 25 earlier, the container file closing process is performed at Step S209 in the flow of FIG. 22, or at Step S508 in the flow of FIG. 25.

Processes according to a flow depicted in FIG. 26 explained below is a sequence of the container file closing process executed in these cases.

Figure 26:
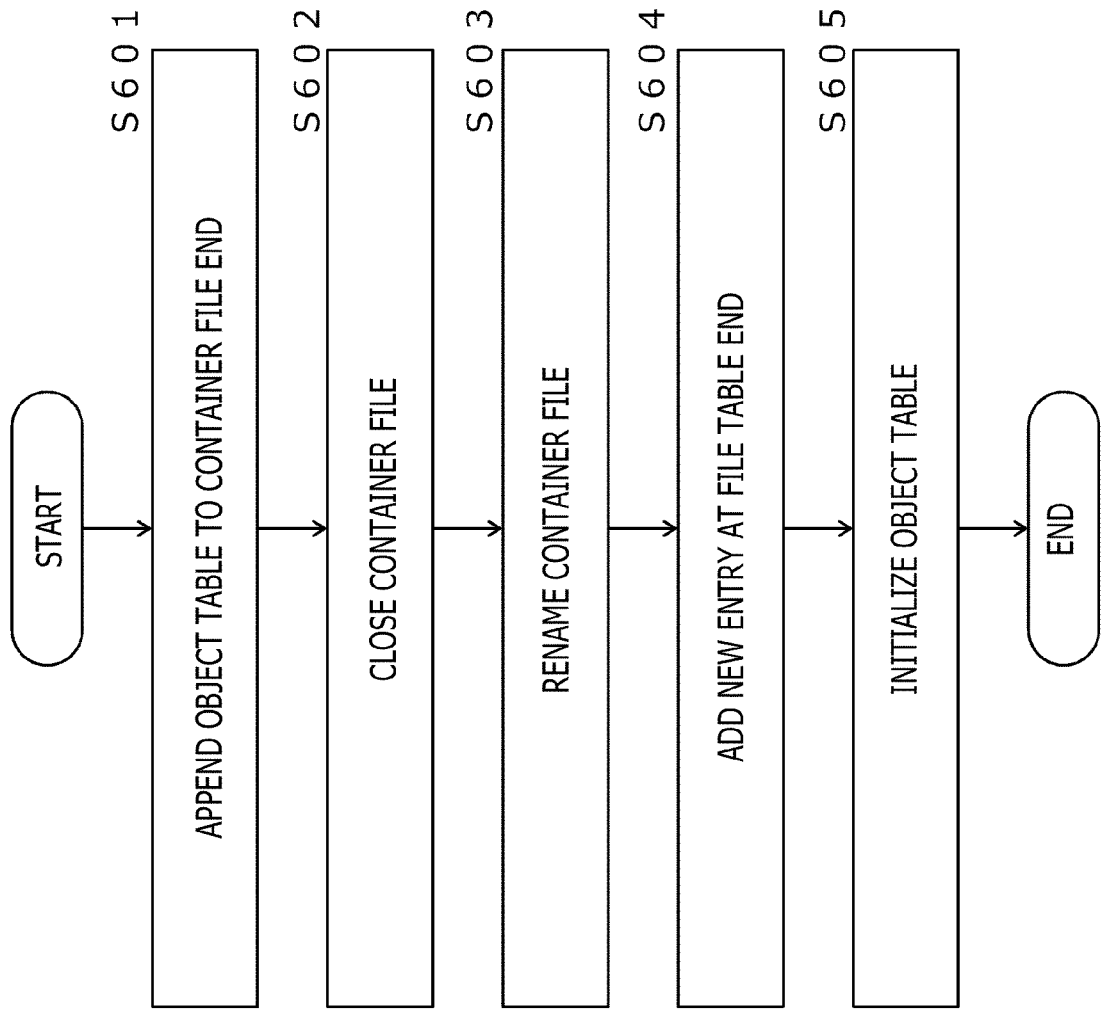
FIG. 26 is a figure depicting a flowchart for explaining a sequence of a process to be performed by the archiving apparatus of the present disclosure in a case where the size of a container file has reached an end reference value while executing data recording on a recording medium such as an optical disk.

Hereinafter, a process at each step of the flow depicted in FIG. 26 is explained sequentially.

(Step S601)

First, at Step S601, the data processing section of the archiving apparatus of the present disclosure reads out a logical object table which is cached data having been recorded on the memory from the memory, and records the table at the end of the container file on the recording medium.

As explained with reference to FIG. 15 earlier, the logical object table is a table in which the type and logical object identifier of each logical object recorded on the recording medium, and the offset position from the beginning of the container file to which the logical object belongs are recorded.

(Step S602)

Next, at Step S602, the container file is closed.

(Step S603)

Thereafter, at Step S603, the name of the closed container file is renamed.

As explained with reference to FIG. 18 and FIG. 19 earlier, the container file name is set as sequential data of the following four numerical values.

(1) First logical object ID (FIRST_LOID)
(2) First logical file ID (FIRST_LFID)
(3) Contents logical object count (N_LO)
(4) Contents file mark count (N_FM)

Of these constituent elements of the container file name, (1) a first logical object ID (FIRST_LOID), and
(2) a first logical file ID (FIRST_LFID)

are fixed at the time point when the first logical object is recorded in the container file.

On the other hand, (3) contents logical object count (N_LO), and
(4) contents file mark count (N_FM)

are not fixed until the time point when the container file is closed because they change serially due to the appending process on the container file.

Accordingly, at Step S603, the data processing section of the archiving apparatus of the present disclosure checks the contents logical object count and the contents file mark count that are fixed at the time point when the container file is closed, generates a new container file name in which the fixed contents logical object count and contents file mark count are set, and renames the container file name with the name.

With this process, the incomplete container file becomes a completed container file, and thereafter appending or modification of the container file is not performed.

(Step S604)

Thereafter, at Step S604, the data processing section of the archiving apparatus of the present disclosure adds a new entry to the container file table recorded on the memory.

The container file table is a table representing a list of container files explained with reference to FIG. 20 earlier.

The archiving apparatus of the present disclosure manages, on the memory, a list of container files on a recording medium as a container file table like the one depicted in FIG. 20.

As depicted in FIG. 20, the container file table is a table in which, for each of container files on the recording medium, each piece of data of (1) a first logical object ID (FIRST_LOID),
(2) a first logical file ID (FIRST_LFID),
(3) a contents logical object count (N_LO), and
(4) a contents file mark count (N_FM) is recorded.

Note that each piece of the data described above corresponds to configuration data of a container file name.

The first logical object ID (identifier) of a container file which is the target of the closing process is a value which is the first logical object ID (identifier) of the previous entry plus the logical object count of the previous entry.

In addition, the first logical file ID (identifier) of the entry is a value which is first logical file ID (identifier) of the previous entry plus the file mark count of the previous entry.

(Step S605)

Last, at Step S605, the data processing section of the archiving apparatus of the present disclosure clears registered data of the logical object table which is cached data having been recorded on the memory.

As explained with reference to FIG. 15 earlier, the logical object table is a table in which the type and logical object identifier of each logical object recorded on the recording medium, and the offset position from the beginning of the container file to which the logical object belongs are recorded.

Because the logical object table has been transcribed on the recording medium such as the optical disk already at Step S601, there are no problems even if it is cleared from the memory.

[3-5. (Process 5) Process to be Performed in Case where Logical Object Count of Container File has Reached Upper Limit]

Next, a sequence of a process to be performed by the archiving apparatus 130 of the present disclosure in a case where the logical object count of the container file has reached a prescribed upper limit while executing data recording on the recording medium such as the optical disk is explained.

In a case where it is decided that the logical object count of the container file has reached the prescribed upper limit at Step S207 in the flow of the logical block appending process explained with reference to FIG. 22 earlier, or at Step S506 in the flow of the file mark appending process explained with reference to FIG. 25 earlier, the container file closing process is performed at Step S209 in the flow of FIG. 22, or at Step S508 in the flow of FIG. 25.

The sequence of the container file closing process to be executed in these cases is a process similar to the process according to the flow depicted in FIG. 26 mentioned above.

[3-6. (Process 6) Process to be Performed in Case where Free Space of Disk on which Recording is being Performed has Fallen below Reference Value]

Next, a sequence of a process to be performed by the archiving apparatus 130 of the present disclosure in a case where the free space of the disk has fallen below the prescribed reference value while executing data recording on the recording medium such as the optical disk is explained.

In a case where it is decided that the free space of the disk has fallen below the prescribed reference value at Step S208 in the flow of the logical block appending process explained with reference to FIG. 22 earlier, or at Step S507 in the flow of the file mark appending process explained with reference to FIG. 25 earlier, the container file closing process is performed at Step S209 in the flow of FIG. 22, or at Step S508 in the flow of FIG. 25.

The sequence of the container file closing process to be executed in these cases is a process similar to the process according to the flow depicted in FIG. 26 mentioned above.

[3-7. (Process 7) Process to be Performed at the Time of Unmounting]

Next, a sequence of a process to be executed by the archiving apparatus 130 of the present disclosure when unmounting the recording medium such as the optical disk, that is, at the time of unmounting in which the data record-able/reproducible disk-attached state is ended is explained.

As a process to be performed in response to an UNLOAD command issued from the host PC 120, for example, the archiving apparatus 130 of the present disclosure ends processes such as data recording on the recording medium such as the optical disk, and executes an unmounting process.

Figure 27:
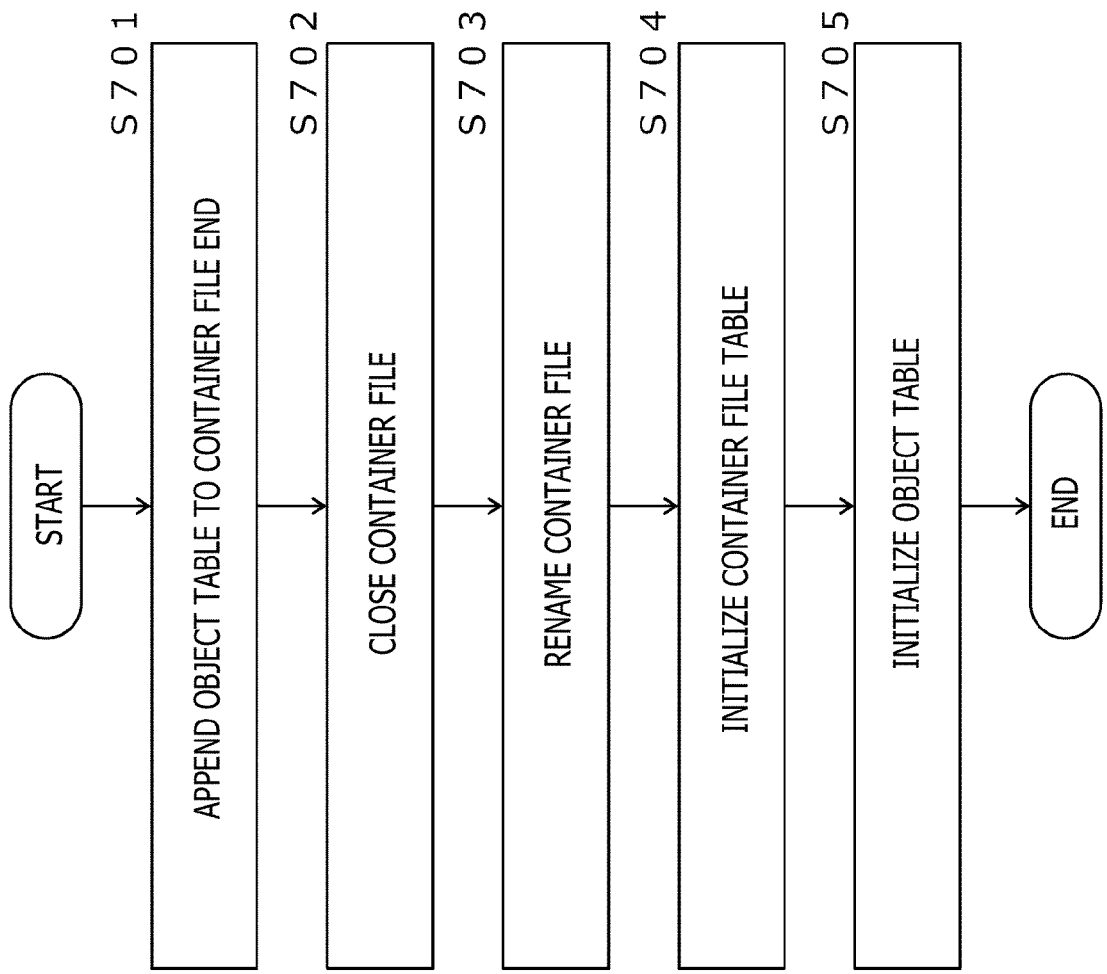
FIG. 27 is a figure depicting a flowchart for explaining a sequence of an unmounting process.

A sequence of the unmounting process is explained with reference to a flowchart depicted in FIG. 27.

(Step S701)

First, at Step S701, the data processing section of the archiving apparatus of the present disclosure appends, at the end of the container file on the recording medium, contents of a logical object table (cached data) having been loaded onto the memory.

As explained with reference to FIG. 15 earlier, the logical object table is a table in which the type and logical object identifier of each logical object recorded on the recording medium, and the offset position from the beginning of the container file to which the logical object belongs are recorded.

(Step S702)

Next, at Step S702, the container file is closed.

(Step S703)

Thereafter, at Step S703, the name of the closed container file is renamed.

This rename process is a process similar to the rename process at Step S603 explained with reference to the flow of FIG. 26 earlier.

(Step S704)

Next, at Step S704, the data processing section of the archiving apparatus of the present disclosure clears the container file table having been loaded onto the memory.

The container file table is a table representing a list of container files explained with reference to FIG. 20 earlier.

While the recording medium such as the optical disk is left mounted, the archiving apparatus of the present disclosure manages, on the memory, a list of container files on the recording medium as a container file table like the one depicted in FIG. 20.

As depicted in FIG. 20, the container file table is a table in which, for each of container files on the recording medium, each piece of data of (1) a first logical object ID (FIRST_LOID),
(2) a first logical file ID (FIRST_LFID),
(3) a contents logical object count (N_LO), and
(4) a contents file mark count (N_FM) is recorded.

Note that each piece of the data described above corresponds to configuration data of a container file name.

When the recording medium is unmounted after access to the recording medium is completed, at Step Sd704, data of container files recorded on the memory is cleared.

(Step S705)

Last, at Step S705, the data processing section of the archiving apparatus of the present disclosure clears registered data of the logical object table which is cached data having been recorded on the memory.

As explained with reference to FIG. 15 earlier, the logical object table is a table in which the type and logical object identifier of each logical object recorded on the recording medium, and the offset position from the beginning of the container file to which the logical object belongs are recorded.

Because the logical object table has been transcribed on the recording medium such as the optical disk already at Step S701, there are no problems even if it is cleared from the memory.

[3-8. (Process 8) Recorded Medium Mounting Process]

Next, a sequence of a process to be performed by the archiving apparatus 130 of the present disclosure when executing a mounting process in which the data recordable/reproducible attached state of the recorded medium on which data has already been recorded is started is explained.

As a process to be performed in response to a LOAD command issued from the host PC 120, for example, the archiving apparatus 130 of the present disclosure executes a process of mounting the recording medium such as the optical disk on which logical objects have been recorded.

The sequence of the mounting process is a sequence similar to the sequence according to the flowchart of FIG. 21 explained as the sequence of "(Process 1) Unused Recording Medium Mounting Process" mentioned before.

A process at each step of the flowchart depicted in FIG. 21 is explained.

(Step S101)

First, at Step S101, the data processing section of the archiving apparatus of the present disclosure calls a file system API, acquires a container file list on a recording medium being mounted, and loads the container file list as a container file table onto the memory.

The file system API used here differs depending on an OS used.

For example, in a Windows OS, the FindFirstFile( ) function and the FindNextFile( ) function are used.

In addition, in a POSIX OS such as Linux (registered trademark), the readdir( ) function can be used.

The data processing section of the archiving apparatus of the present disclosure uses these functions to acquire the container file list on the recording medium.

The container file list to be acquired is a list of container file names. That is, those are container file names like the one explained with reference to FIG. 19, and the file name of each container file includes the four types of data which are the first logical object ID (identifier),
the ID (identifier) of the logical file to which the first logical object belongs,
the number of logical objects included in the container file, and
the number of file marks included in the container file.

The data processing section of the archiving apparatus of the present disclosure acquires the container file names of container files having been recorded on the recording medium such as the optical disk being mounted, and records the container file names as a container file table on the memory.

The container file table is created as a container file table including the data explained with reference to FIG. 20 earlier, and is recorded on the memory.

Each entry of the container file table depicted in FIG. 20 has information corresponding to one container file.

(Step S102)

At the next Step S102, the data processing section of the archiving apparatus of the present disclosure sorts the container file table recorded on the memory in ascending order of first logical block identifiers.

Note that on the recorded medium, data related to recorded container files is recorded in the container file table.

(Step S103)

Next, at Step S103, the data processing section of the archiving apparatus of the present disclosure newly adds an entry at the end of the container file table recorded on the memory.

The newly added entry is an entry corresponding to a container file for storing logical objects to be recorded thereafter.

This ends the recorded medium mounting process.

[3-9. (Process 9) Process to be Performed at the Time of Seeking]

Next, a sequence of a process to be performed by the archiving apparatus 130 of the present disclosure when executing a seek process in which a target data is searched for on a recording medium such as an optical disk is explained.

For example, as a process to be performed in response to a LOCATE or SPACE command issued from the host PC 120, the archiving apparatus 130 of the present disclosure performs a seek process of setting the pickup to a specified logical object position in order to access the specified logical object in a disk having been mounted.

Figure 28:
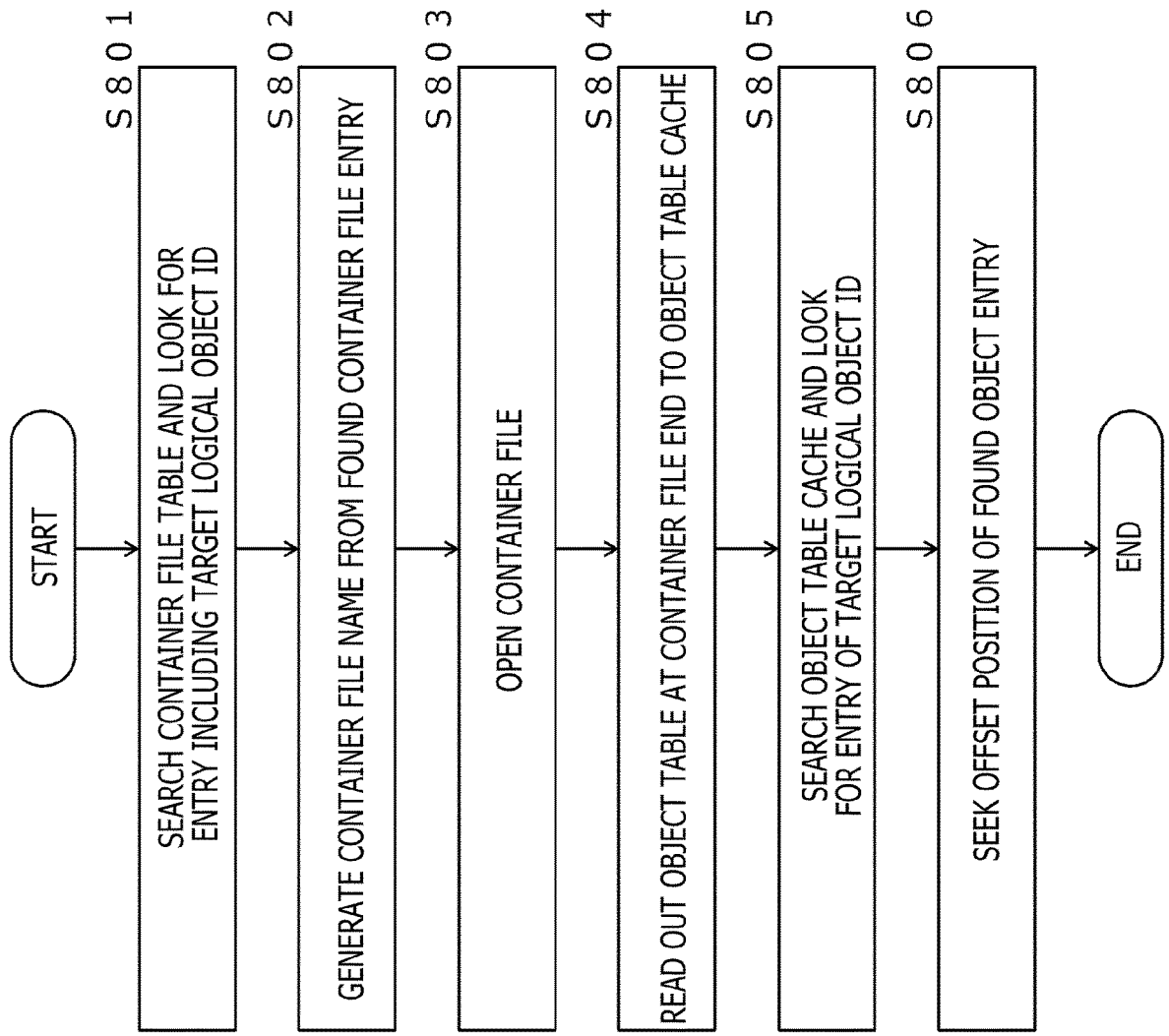
FIG. 28 is a figure depicting a flowchart for explaining a sequence of a seek process.

A sequence of the seek process is explained with reference to a flowchart depicted in FIG. 28.

(Step S801)

First, at Step S801, the data processing section of the archiving apparatus of the present disclosure searches a container file table having been recorded on the memory, and searches for a container file entry including the logical object specified by the LOCATE or SPACE command issued from the host PC 120.

As explained with reference to FIG. 20 earlier, the container file table recorded on the memory is a table in which, for each of container files on the recording medium, each piece of data of (1) a first logical object ID (FIRST_LOID),
(2) a first logical file ID (FIRST_LFID),
(3) a contents logical object count (N_LO), and
(4) a contents file mark count (N_FM) is recorded.

Note that each piece of the data described above corresponds to configuration data of a container file name.

As depicted in FIG. 20, the logical object identifiers of first logical objects included in container files, and the logical object counts of the container files are recorded in entries of the container files. Accordingly, when a certain logical object identifier is given, it is possible to determine whether or not the logical object is included in a container file only on the basis of the entry information.

In addition, because the entries are sorted in ascending order of first logical object identifiers, the table can be searched by binary search.

(Step S802)

Next, on the basis of the target container file found in the container file table search at Step S801, that is, recorded data of a container file table of a container file entry including the logical object specified by the LOCATE or SPACE command issued from the host PC 120, a file name of the container file is generated.

As explained with reference to FIG. 18 FIG. 20 earlier, each piece of data of (1) a first logical object ID (FIRST_LOID),
(2) a first logical file ID (FIRST LFID),
(3) a contents logical object count (N_LO), and
(4) a contents file mark count (N_FM)

which are recorded data of each entry of container files registered in the container file table corresponds to configuration data of a container file name.

That is, by sequentially arranging the data (1) to (4) described above, the container file name is generated.

At Step S802, the container file name generation process is executed.

(Step S803)

Next, at Step S803, on the basis of the container file name generated at Step S802, the data processing section of the archiving apparatus of the present disclosure reads out the container file with the container file name from the recording medium, and opens the container file.

(Step S804)

Next, at Step S804, the data processing section of the archiving apparatus of the present disclosure loads (transfers and records), onto the memory, a logical object table recorded at the end of the opened container file.

(Step S805)

Next, at Step S805, the data processing section of the archiving apparatus of the present disclosure searches the logical object table recorded on the memory, and looks for an entry having the specified logical object identifier.

Note that, as explained with reference to FIG. 15 earlier, the logical object table is a table in which the type and logical object identifier of each logical object recorded on the recording medium, and the offset position from the beginning of the container file to which the logical object belongs are recorded.

Note that because entries of the logical object table are sorted in order of logical object identifiers, the table can be searched by binary search.

(Step S806)

Next, at Step S806, on the basis of information recorded in the entry of the target logical object extracted in the logical object table search at Step S805, the data processing section of the archiving apparatus of the present disclosure performs a seek process of identifying the position of the target logical object recorded in the container file, and setting the pickup to the position where the logical object can be read out.

Note that the intra-container-file position of each logical object, that is, the offset from the beginning, is recorded in entries of a logical object table, and the position of each logical object in the container file can be identified on the basis of the offset information.

[4. About Hardware Configuration Examples of Archiving Apparatus and Host PC]

Next, hardware configuration examples of the archiving apparatus 130 and the host PC (user apparatus) 120 that execute processes mentioned above are explained with reference to FIG. 29.

Figure 29:
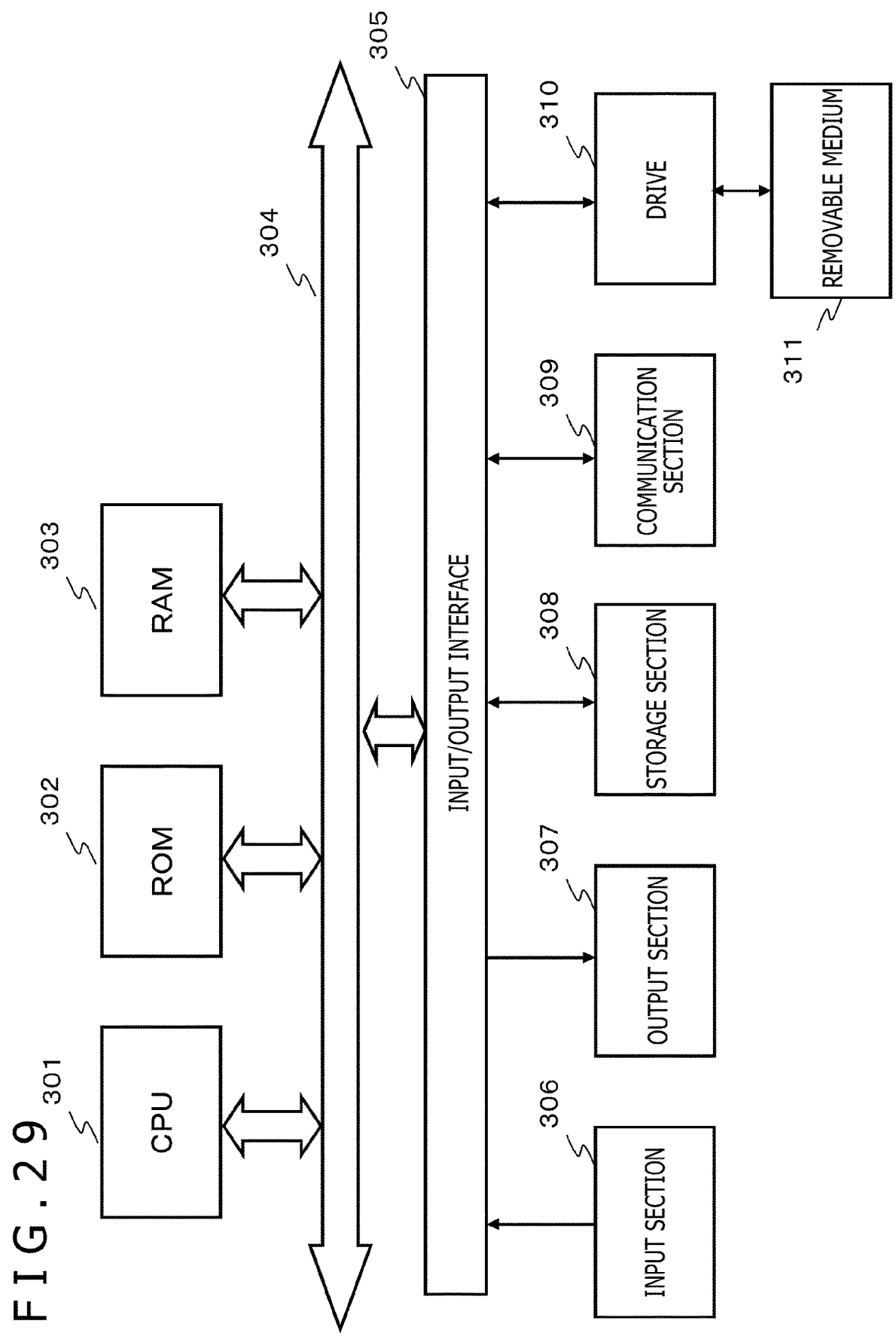
FIG. 29 is a figure for explaining a hardware configuration example of an information processing apparatus included in the archiving apparatus or the user apparatus.

FIG. 29 is a figure depicting one configuration example of hardware that can be applied as the archiving apparatus 130 and the user apparatus 120.

The configuration depicted in FIG. 29 is explained.

A CPU (Central Processing Unit) 301 functions as a data processing section that executes various types of process according to a program stored on a ROM (Read Only Memory) 302 or a storage section 308. For example, the CPU 301 executes the processes according to the sequences explained in the embodiment mentioned above. A RAM (Random Access Memory) 303 stores programs executed by the CPU 301, data, and the like. These CPU 301, ROM 302, and RAM 303 are interconnected by a bus 304.

The CPU 301 is connected to an input/output interface 305 via the bus 304, and the input/output interface 305 is connected with an input section 306 including various types of switch, a keyboard, a touch panel, a mouse, a microphone, and the like, and with an output section 307 including a display, a speaker, and the like.

The CPU 301 receives, as inputs, commands, status data, and the like input from the input section 306, executes various types of process, and outputs processing results to the output section 307, for example.

The storage section 308 connected to the input/output interface 305 includes a hard disk and the like, for example, and stores programs to be executed by the CPU 301, and various types of data. A communication section 309 functions as a transmitting/receiving section for data communication via networks such as the Internet or a local area network, and communicates with external apparatuses.

A drive 310 connected to the input/output interface 305 drives a removable medium 311 such as a magnetic disk, an optical disk, a magneto-optical disk, or a semiconductor memory such as a memory card, and executes data recording or readout.

[5. Summary of Configuration of Present Disclosure]

Thus far, embodiments of the present disclosure are explained in detail with reference to a particular embodiment. However, it is self-evident that those skilled in the art can make corrections to, or use substitutes in the embodiment within the scope not deviating from the gist of the present disclosure. That is, the present invention has been disclosed in exemplary forms and should not be interpreted in a limited manner. In order to determine the gist of the present disclosure, the section of claims should be considered.

Note that the technology disclosed in the specification can have configuration like the ones mentioned below.

(1)

An information processing apparatus including:

a data processing section that executes control of access to a recording medium, in which the data processing section generates a logical object table that is a management table for each container file including a logical object that is a unit of data recorded on the recording medium, and records the logical object table on a memory, and during execution of a process on a container file to be recorded on the recording medium, decides whether or not a container file size has become equal to or larger than a prescribed reference value, and in a case where it is decided that the container file size has become equal to or larger than the reference value, reads out the logical object table from the memory, records the logical object table on the recording medium, and closes the container file.

(2)

The information processing apparatus according to (1), in which, during the execution of the process on the container file to be recorded on the recording medium, the data processing section decides whether or not a logical object count of the container file has reached a prescribed upper limit, and in a case where it is decided that the logical object count has reached the upper limit, reads out the logical object table from the memory, records the logical object table on the recording medium, and closes the container file.

(3)

The information processing apparatus according to (1) or (2), in which, during the execution of the process on the container file to be recorded on the recording medium, the data processing section decides whether or not a free space of the recording medium has become equal to or smaller than a prescribed reference value, and in a case where it is decided that the free space has become equal to or smaller than the reference value, reads out the logical object table from the memory, records the logical object table on the recording medium, and closes the container file.

(4)

The information processing apparatus according to any of (1) to (3), in which, at a time of an unmounting process of the recording medium, the data processing section reads out the logical object table from the memory, records the logical object table on the recording medium, and closes the container file.

(5)

The information processing apparatus according to any of (1) to (4), in which, at a time of closing the container file, the data processing section changes a file name of the container file.

(6)

The information processing apparatus according to (5), in which the file name of the container file is a file name including data about each of (1) a first logical object ID (FIRST_LOID),
(2) a first logical file ID (FIRST_LFID),
(3) a contents logical object count (N_LO), and
(4) a contents file mark count (N_FM) of the container file.

(7)

The information processing apparatus according to any of (1) to (6), in which the logical object table is a table in which a type and a logical object identifier of a logical object recorded on the recording medium, and an offset position from a beginning of a container file to which the logical object belongs are recorded.

(8)

The information processing apparatus according to any of (1) to (7), in which, in a process of seeking the logical object recorded on the recording medium, the data processing section refers to recorded data of the logical object table and decides a recording position of the logical object.

(9)

The information processing apparatus according to any of (1) to (8), in which, when executing a process of recording a new logical object on the container file to be recorded on the recording medium, the data processing section records, at a position in front of and adjacent to the logical object, a header including object type information of the logical object to be recorded and size information of the logical object.

(10)

The information processing apparatus according to (9), in which the object type information is information for identifying whether the logical object is a logical block including recorded data input from an external apparatus or a file mark that is a positioning mark.

(11)

The information processing apparatus according to any of (1) to (10), in which the data processing section generates a container file table that is management data for each container file recorded on the recording medium, and records the container file table on the memory.

(12)

The information processing apparatus according to (11), in which the container file table is a table in which data about each of (1) a first logical object ID (FIRST_LOID),
(2) a first logical file ID (FIRST_LFID),
(3) a contents logical object count (N_LO), and (4) a contents file mark count (N_FM) of each container file is recorded.

(13)

The information processing apparatus according to any of (1) to (12), in which a data format of the container file is a ZIP format.

(14)

The information processing apparatus according to any of (1) to (13), in which the recording medium is an optical disk.

(15)

An information processing method executed in an archiving apparatus, in which the archiving apparatus includes a data processing section that executes control of access to a recording medium, and the data processing section generates a logical object table that is a management table for each container file including a logical object that is a unit of data recorded on the recording medium, and records the logical object table on a memory, and during execution of a process on a container file to be recorded on the recording medium, decides whether or not a container file size has become equal to or larger than a prescribed reference value, and in a case where it is decided that the container file size has become equal to or larger than the reference value, reads out the logical object table from the memory, records the logical object table on the recording medium, and closes the container file.

(16)

A program for causing an archiving apparatus to execute information processing, in which the archiving apparatus includes a data processing section that executes control of access to a recording medium, and the program causes the data processing section to generate a logical object table that is a management table for each container file including a logical object that is a unit of data recorded on the recording medium, and record the logical object table on a memory, and during execution of a process on a container file to be recorded on the recording medium, decide whether or not a container file size has become equal to or larger than a prescribed reference value, and in a case where it is decided that the container file size has become equal to or larger than the reference value, read out the logical object table from the memory, record the logical object table on the recording medium, and execute a process of closing the container file.

In addition, a series of processes explained in the specification can be executed by hardware, software, or a combined configuration of both hardware and software. In a case where the processes are executed by software, a program having process sequences recorded thereon can be installed on a memory in a computer incorporated into dedicated hardware, and executed thereon, or the program can be installed on a general-purpose computer that can execute various types of process, and executed thereon. For example, the program can be recorded in advance on a recording medium. Other than being installed from the recording medium onto a computer, the program can be received via networks like a LAN (Local Area Network) and the Internet, and installed on a recording medium such as a built-in hard disk.

Note that various types of process described in the specification may not only be executed in time series according to the description but may be executed in parallel or individually according to the processing capability of an apparatus that executes the processes or as necessary. In addition, in the specification, systems are a logical set configuration of a plurality of apparatuses, and apparatuses of individual configurations are located in a single housing in some cases, but systems are not limited to ones having apparatuses of individual configurations that are located in a single housing.

INDUSTRIAL APPLICABILITY

As explained above, according to the configuration of one embodiment of the present disclosure, an archiving apparatus that realizes high-speed seek processes and the like by setting a logical object table for each container file with a predetermined size, and closing the container file under a predetermined condition is realized.

Specifically, for example, a data processing section that executes control of access to a recording medium generates a logical object table for managing a container file including logical objects which are recorded data units, and records the logical object table on a memory. In a case where a prescribed condition is satisfied, for example, the container file size has become equal to or larger than a prescribed end reference value, and so on, while a process on the container file is being executed, the logical object table is read out from the memory, and recorded on the recording medium, and the container file is closed.

According to this configuration, an archiving apparatus that realizes high-speed seek processes and the like by setting a logical object table for each container file with a predetermined size and closing the container file under a predetermined condition is realized.

REFERENCE SIGNS LIST

10: Information processing system
20: Host PC (user apparatus)
21: Application program
22: Tape device driver
23: iSCSI initiator service
24: Network controller (NIC)
30: Archiving apparatus
31: Tape access section
32: Network controller (NIC)
33: iSCSI target service
34: Tape emulator
35: File system driver
36: Disk access section
100: Information processing system
120: Host PC (user apparatus)
121: Application program
122: Tape device driver
123: ISCSI initiator service
124: Network controller (NIC)
130: Archiving apparatus
132: Network controller (NIC)
133: iSCSI target service
134: Tape emulator
135: File system driver
136: Disk access section
141: Header processing section
142: Logical object table processing section
301: CPU
302: ROM
303: RAM
304: Bus
305: Input/output interface
306: Input section 307: Output section
308: Storage section
309: Communication section
310: Drive
311: Removable medium

The invention claimed is:

1. An information processing apparatus, comprising:
a data processing section configured to:
  control access to a recording medium;
  generate a logical object table that is a management table for each container file of a plurality of container files, wherein each container file of the plurality of container files includes a logical object that is a unit of data recorded on the recording medium;
  record the logical object table on a memory;
  during execution of a process on a container file of the plurality of container files to be recorded on the recording medium, determine a size of the container file has become equal to or larger than a first reference value;
  read out the logical object table from the memory based on the determination that the size of the container file has become equal to or larger than the first reference value;
  record the readout logical object table on the recording medium; and
  close the container file subsequent to the record of the readout logical object table.

2. The information processing apparatus according to claim 1, wherein the data processing section is further configured to:
  determine, during the execution of the process on the container file to be recorded on the recording medium, a logical object count of the container file has reached a prescribed upper limit; and
  read out the logical object table from the memory based on the determination that the logical object count has reached the prescribed upper limit.

3. The information processing apparatus according to claim 1, wherein the data processing section is further configured to:
  determine, during the execution of the process on the container file to be recorded on the recording medium, a free space of the recording medium has become equal to or smaller than a second reference value; and
  read out the logical object table from the memory based on the determination that the free space has become equal to or smaller than the second reference value.

4. The information processing apparatus according to claim 1, wherein, at a time of an unmounting process of the recording medium, the data processing section is further configured to:
  read out the logical object table from the memory;
  record the readout logical object table on the recording medium; and
  close the container file subsequent to the record of the readout logical object table.

5. The information processing apparatus according to claim 1, wherein, at a time of closing the container file, the data processing section is further configured to change a file name of the container file.

6. The information processing apparatus according to claim 5, wherein the file name of the container file includes data about each of a first logical object ID (FIRST_LOID), a first logical file ID (FIRST_LFID), a contents logical object count (N_LO), and a contents file mark count (N_FM) of the container file.

7. The information processing apparatus according to claim 1, wherein the logical object table is a table in which a type and a logical object identifier of the logical object recorded on the recording medium, and an offset position from a beginning of the container file to which the logical object belongs are recorded.

8. The information processing apparatus according to claim 1, wherein, in a process of seeking the logical object recorded on the recording medium, the data processing section is further configured to refer to recorded data of the logical object table and determine a recording position of the logical object.

9. The information processing apparatus according to claim 1, wherein, in a case of execution of a process of recording a new logical object on the container file to be recorded on the recording medium, the data processing section is further configured to record, at a position in front of and adjacent to the logical object, a header including object type information of the logical object to be recorded and size information of the logical object.

10. The information processing apparatus according to claim 9, wherein the object type information is information for identifying whether the logical object is one of a logical block including recorded data input from an external apparatus or a file mark that is a positioning mark.

11. The information processing apparatus according to claim 1, wherein the data processing section is further configured to:
  generate a container file table that is management data for each container file of the plurality of container files recorded on the recording medium; and
  record the container file table on the memory.

12. The information processing apparatus according to claim 11, wherein the container file table is a table in which data about each of a first logical object ID (FIRST_LOID), a first logical file ID (FIRST_LFID), a contents logical object count (N_LO), and a contents file mark count (N_FM) of each container file of the plurality of container files is recorded.

13. The information processing apparatus according to claim 1, wherein a data format of the container file is a ZIP format.

14. The information processing apparatus according to claim 1, wherein the recording medium is an optical disk.

15. An information processing method, comprising:
in an archiving apparatus that includes, a data processing section:
  controlling, by the data processing section, access to a recording medium;
  generating, by the data processing section, a logical object table that is a management table for each container file of a plurality of container files, wherein each container file of the plurality of container files includes a logical object that is a unit of data recorded on the recording medium;
  recording, by the data processing section, the logical object table on a memory;
  during execution of a process on a container file of the plurality of container files to be recorded on the recording medium, determining, by the data processing section, a size of the container file has become equal to or larger than a prescribed reference value;
  reading out, by the data processing section, the logical object table from the memory based on the determination that the size of the container file has become equal to or larger than the prescribed reference value;

recording, by the data processing section, the readout logical object table on the recording medium; and closing, by the data processing section, the container file subsequent to the record of the readout logical object table.

16. A non-transitory computer-readable medium having stored thereon, computer-executable instructions which, when executed by an archiving apparatus, cause the archiving apparatus to execute operations, the operations comprising:

controlling, by a data processing section of the archiving apparatus, access to a recording medium;

generating, by the data processing section, a logical object table that is a management table for each container file of a plurality of container files, wherein each container file of the plurality of container files includes a logical object that is a unit of data recorded on the recording medium;

recording, by the data processing section, the logical object table on a memory;

during execution of a process on a container file of the plurality of container files to be recorded on the recording medium, determining, by the data processing section, a size of the container file has become equal to or larger than a prescribed reference value;

reading out, by the data processing section, the logical object table from the memory based on the determination that the size of the container file has become equal to or larger than the prescribed reference value;

recording, by the data processing section, the readout logical object table on the recording medium; and closing, by the data processing section, the container file subsequent to the record of the readout logical object table.

* * * * *